US008893171B2

(12) United States Patent
Worthen

(10) Patent No.: US 8,893,171 B2
(45) Date of Patent: Nov. 18, 2014

(54) METHOD AND APPARATUS FOR PRESENTING AND AGGREGATING INFORMATION RELATED TO THE SALE OF MULTIPLE GOODS AND SERVICES

(75) Inventor: William C. Worthen, Minnetonka, MN (US)

(73) Assignee: Unityworks! LLC, Edina, MN (US)

( * ) Notice: Subject to any disclaimer, the term of this patent is extended or adjusted under 35 U.S.C. 154(b) by 430 days.

(21) Appl. No.: 11/999,523

(22) Filed: Dec. 4, 2007

(65) Prior Publication Data

US 2008/0295130 A1 Nov. 27, 2008

Related U.S. Application Data

(63) Continuation-in-part of application No. 11/753,412, filed on May 24, 2007.

(51) Int. Cl.
| H04N 7/10 | (2006.01) |
| H04N 21/482 | (2011.01) |
| H04N 7/173 | (2011.01) |
| H04N 21/643 | (2011.01) |
| H04N 21/2743 | (2011.01) |
| H04N 21/4788 | (2011.01) |
| H04N 21/854 | (2011.01) |
| H04N 21/8405 | (2011.01) |

(52) U.S. Cl.
CPC ....... *H04N 7/17318* (2013.01); *H04N 21/4825* (2013.01); *H04N 21/64322* (2013.01); *H04N 21/2743* (2013.01); *H04N 21/4788* (2013.01); *H04N 21/85406* (2013.01); *H04N 21/8405* (2013.01)
USPC .................................. 725/32; 725/33; 725/34

(58) Field of Classification Search
None
See application file for complete search history.

(56) References Cited

U.S. PATENT DOCUMENTS

| 5,263,869 A | 11/1993 | Ziv-El |
| 5,493,490 A * | 2/1996 | Johnson ....................... 705/26.4 |
| 5,793,365 A | 8/1998 | Tang et al. |
| 5,801,685 A | 9/1998 | Miller et al. |
| 5,862,346 A | 1/1999 | Kley et al. |

(Continued)

FOREIGN PATENT DOCUMENTS

| WO | WO 01/58131 A2 | 8/2001 |
| WO | WO 2004/063840 A2 | 7/2004 |

OTHER PUBLICATIONS

U.S. Appl. No. 11/753,412, filed May 24, 2007, Worthen.

(Continued)

*Primary Examiner* — Chenea Smith
(74) *Attorney, Agent, or Firm* — McDermott Will & Emerty LLP

(57) ABSTRACT

A computer-implemented method can automatically present a plurality of selectable rich media video clips associated with goods and/or services offered for sale via an interactive networked communication system including at least one client and at least one server. A request to the server can be initiated at the client via the interactive networked communication system to select a plurality of rich media video clips from a database of rich media video clips associated with corresponding goods and/or services. A static descriptor can be displayed on the client for each of the plurality of rich media video clips as selected and received from the server. The plurality of rich media video clips can automatically be presented on the client in a concatenated sequence in a continuous rich media video stream.

21 Claims, 27 Drawing Sheets

(56) References Cited

U.S. PATENT DOCUMENTS

| | | | |
|---|---|---|---|
| 5,878,214 | A | 3/1999 | Gilliam et al. |
| 5,956,491 | A | 9/1999 | Marks |
| 5,974,446 | A | 10/1999 | Sonnenreich et al. |
| 5,999,968 | A | 12/1999 | Tsuda |
| 6,075,768 | A | 6/2000 | Mishra |
| 6,088,702 | A | 7/2000 | Plantz et al. |
| 6,119,147 | A | 9/2000 | Toomey et al. |
| 6,154,771 | A | 11/2000 | Rangan et al. |
| 6,209,100 | B1 | 3/2001 | Robertson et al. |
| 6,223,165 | B1 | 4/2001 | Lauffer |
| 6,332,175 | B1 | 12/2001 | Birrell et al. |
| 6,421,726 | B1 | 7/2002 | Kenner et al. |
| 6,496,856 | B1 | 12/2002 | Kenner et al. |
| 6,546,188 | B1 | 4/2003 | Ishii et al. |
| 6,581,075 | B1 | 6/2003 | Guturu et al. |
| 6,643,663 | B1 | 11/2003 | Dabney et al. |
| 6,654,930 | B1 | 11/2003 | Zhou et al. |
| 6,677,981 | B1 | 1/2004 | Mancuso et al. |
| 6,694,200 | B1 | 2/2004 | Naim |
| 6,701,343 | B1 | 3/2004 | Kenyon |
| 6,732,101 | B1 | 5/2004 | Cook |
| 6,760,916 | B2 | 7/2004 | Holtz et al. |
| 6,985,934 | B1* | 1/2006 | Armstrong et al. ............ 709/219 |
| 7,302,696 | B1* | 11/2007 | Yamamoto ...................... 725/23 |
| 7,313,810 | B1 | 12/2007 | Bell et al. |
| 7,346,656 | B2 | 3/2008 | Worthen |
| 7,610,358 | B2 | 10/2009 | Benschoter et al. |
| 7,870,577 | B2* | 1/2011 | Haberman et al. .............. 725/35 |
| 8,032,427 | B1 | 10/2011 | Spreen et al. |
| 2001/0029501 | A1 | 10/2001 | Yokobori et al. |
| 2001/0056469 | A1 | 12/2001 | Oonuki |
| 2002/0010794 | A1 | 1/2002 | Stanbach, Jr. et al. |
| 2002/0023018 | A1 | 2/2002 | Kleinbaum |
| 2002/0023132 | A1 | 2/2002 | Tornabene et al. |
| 2002/0029179 | A1 | 3/2002 | Gruber et al. |
| 2002/0034255 | A1 | 3/2002 | Zetts |
| 2002/0038299 | A1 | 3/2002 | Zernik et al. |
| 2002/0055892 | A1 | 5/2002 | Brown et al. |
| 2002/0056119 | A1 | 5/2002 | Moynihan |
| 2002/0062250 | A1* | 5/2002 | Nagano et al. .................. 705/14 |
| 2002/0063732 | A1 | 5/2002 | Mansikkaniemi et al. |
| 2002/0073026 | A1 | 6/2002 | Grubert et al. |
| 2002/0077839 | A1 | 6/2002 | Siegel et al. |
| 2002/0091538 | A1 | 7/2002 | Schwartz et al. |
| 2002/0091725 | A1 | 7/2002 | Skok |
| 2002/0099654 | A1 | 7/2002 | Nair |
| 2002/0107728 | A1* | 8/2002 | Bailey et al. ................... 705/14 |
| 2002/0129089 | A1 | 9/2002 | Hedge et al. |
| 2002/0169797 | A1 | 11/2002 | Hedge et al. |
| 2002/0175917 | A1 | 11/2002 | Chakravarty et al. |
| 2003/0049591 | A1 | 3/2003 | Fechter |
| 2003/0061114 | A1 | 3/2003 | Schwartz et al. |
| 2003/0167449 | A1 | 9/2003 | Warren et al. |
| 2003/0182371 | A1 | 9/2003 | Worthen |
| 2003/0191816 | A1 | 10/2003 | Landress et al. |
| 2003/0200145 | A1 | 10/2003 | Krassner et al. |
| 2003/0214538 | A1 | 11/2003 | Hegde et al. |
| 2003/0225613 | A1 | 12/2003 | Shahoumian et al. |
| 2004/0019648 | A1 | 1/2004 | Huynh et al. |
| 2004/0226048 | A1 | 11/2004 | Alpert et al. |
| 2005/0027696 | A1 | 2/2005 | Swaminathan et al. |
| 2005/0144302 | A1 | 6/2005 | Farrington et al. |
| 2005/0195076 | A1* | 9/2005 | McCulloch et al. .......... 340/500 |
| 2005/0240433 | A1 | 10/2005 | Schwartz et al. |
| 2005/0240596 | A1 | 10/2005 | Worthen et al. |
| 2005/0251461 | A1 | 11/2005 | Nykamp |
| 2005/0256780 | A1 | 11/2005 | Eldred |
| 2005/0256941 | A1 | 11/2005 | Armstrong et al. |
| 2006/0026067 | A1 | 2/2006 | Nicholas et al. |
| 2006/0026655 | A1 | 2/2006 | Perez |
| 2006/0168064 | A1 | 7/2006 | Huynh et al. |
| 2006/0271947 | A1 | 11/2006 | Lienhart et al. |
| 2007/0112676 | A1 | 5/2007 | Markku et al. |
| 2007/0168193 | A1 | 7/2007 | Aaron et al. |
| 2007/0189708 | A1 | 8/2007 | Lerman et al. |
| 2007/0204064 | A1 | 8/2007 | Mail et al. |
| 2007/0282819 | A1 | 12/2007 | Lynn et al. |
| 2008/0082410 | A1 | 4/2008 | Zhou et al. |
| 2008/0092193 | A1 | 4/2008 | Lee et al. |
| 2008/0098301 | A1 | 4/2008 | Black et al. |
| 2008/0141307 | A1* | 6/2008 | Whitehead ...................... 725/46 |
| 2008/0222012 | A1* | 9/2008 | Murthy ........................... 705/27 |
| 2008/0292265 | A1 | 11/2008 | Worthen |
| 2009/0196570 | A1 | 8/2009 | Dudas et al. |

OTHER PUBLICATIONS

Kim, Amy Jo; "Community Building on the Web"; 2000; Peachpit Press; Chapters 1 and 2.

Website Print-Out: Intranet News, http://www.intranetjournal.com, 3 pgs.; Sep. 2002.

Vendaria Envision Video E-mail, www.vendaria.com/solution/vmail, Jan. 21, 2004.

"Vendaria: Paving the Future of Web Marketing by Video", L. Sivitz, www.seattle24x7.com/up/vendaria.htm, Jul. 9, 2004.

Edmunds.com Photos and Video www.edmunds.com/used/2005/audi/at/100415318/photos.html, Dec. 8, 2005.

CarsDirect—How Does it Work, www.carsdirect.com/the_company/how_cdc_works, Dec. 8, 2005.

CarsDirect—Used Cars, www.carsdirect.com/used-cars/search, Dec. 8, 2005.

Kia—www.kia.com/amanti/amanti-views-flash.php, Dec. 8, 2005.

Autobyte1.com—www.autobyte1.com/content/research;vir/index.cfm/action/media;series-id.int/38677/media/photo, Dec. 8, 2005.

Streaming21.com—www.streaming21.com/xpdf/streaming21_platform.pdg, Dec. 8, 2005.

PCT International Search Report, PCT/US2008/064905, 2 pages.

European Search Report issued in European Patent Application No. EP 08756320.1 dated Feb. 1, 2011.

M. Hinz, "Online Advertising: Maximierung des Return on Advertising (ROA) unter Anwendung der acht Online-Advertising-Prinzipien" [Online], Sep. 26, 2006.

US Office Action issued in U.S. Appl. No. 11/753,412 dated Jul. 3, 2012.

US Office Action issued in corresponding U.S. Appl. No. 11/753,412, dated Dec. 17, 2012.

United States Office Action issued in U.S. Appl. No. 11/753,412 dated May 13, 2010.

Unites States Office Action issued in U.S. Appl. No. 11/753,412, dated Mar. 27, 2014.

Non-Final Office Action U.S. Appl. No. 14/250,049 dated Aug. 4, 2014.

* cited by examiner

METHOD AND APPARATUS FOR PRESENTING AND AGGREGATING INFORMATION RELATED TO THE SALE OF MULTIPLE GOODS AND SERVICES

PRIORITY CLAIM

This application is a continuation-in-part of U.S. patent application Ser. No. 11/753,412, filed May 24, 2007, which is hereby incorporated by reference in its entirety.

FIELD OF THE INVENTION

The present invention relates generally to the generation and production of video advertisements to be presented via the Internet. More particularly, the present invention relates to a method and apparatus for high quality mass production of customized video clips for the promotion of products and services.

BACKGROUND OF THE INVENTION

The Internet has become an increasingly important part of the sales industry. Today, many buyers perform some kind of online research prior to making purchases. Not surprisingly, Internet advertising has steadily increased as a percentage of all advertising.

Developments such as these have spawned an entire industry that specializes in providing services relating to the creation and dissemination of advertising content. These kinds of business generally use the Internet infrastructure to some degree.

As the number of buyers and sellers using the Internet increases, the amount of product related information available on the Internet has proliferated. Most of this information is relatively undifferentiated, necessitating considerable time and effort on the potential buyer's part to tease out the information he or she seeks. One way to differentiate a given seller is to create advertisements that stand out from the crowd or increase the amount of time that is spent at the seller's web site so as to improve the chances of making a sale to the web visitor.

While customized audiovisual advertisements are known to be more attractive and increase the time a potential buyer spends at a website, the costs involved in producing and disseminating high quality, high bandwidth advertisements would be cost prohibitive if professional video production were used. This problem is further compounded when there is a need to efficiently and professionally create a multitude of unique, customized advertisements for the various products being sold by a given seller.

There are several techniques and technologies that make it possible to automate the creation of rich media content and make it possible to create productions involving the real-time display of images and text synchronized to an audio track, for example. These include animation tools (e.g. Flash from Macromedia Inc.), authoring tools for streaming media (e.g. RealPlayer from Real Networks Inc.), digital cameras, video recorders, commercial software packages such as for example, MovingPicture software from StageTools LLC in conjunction with video editors such as Adobe Premiere or Avid Xpress DV.

U.S. Pat. No. 5,801,685 and U.S. Patent Publ. No. 20020175917A1 describe generalized video editing systems for working with streaming media and video clips. U.S. Pat. No. 6,677,981 describes a system for video play-back of a still image with an image generator for generating a panoramic image by stitching together a plurality of images.

Various systems and techniques have been developed to aid in the production of rich media audiovisual content that includes text to be read accompanying the video footage. In the broadcast news editing system described in U.S. Pat. No. 5,801,685, for example, selected video clips are linked to a script text by embedding edit link control sequences into the text at selected points. The control sequences in the script text are linked to an edit decision list (EDL) that defines the video clips that are to be synchronized to the script text. In preparing a news story for broadcast, the EDL is used to generate the video portion of the broadcast with the synchronized text displayed for reading by a news announcer. U.S. Pat. No. 6,654,930 discloses a similar editing system for producing video news footage that displays a sequence of text associated with a sequence of video frames, defining time codes in the text and a reading rate to indicate whether the text matches the video sequence.

It is also known to distribute such rich media content via email. U.S. Patent Publ. No. 20040019648A1 describes a facility for generating and presenting rich media email messages. U.S. Patent Publ. No. 20060168064A1 describes a message management system for creating and/or adapting electronic messages with digital content.

Unfortunately, the learning curve to use these products can be substantial and the amount of time required to produce any given customized video segment is often measured in hours, not minutes. As a result, mass production of customized rich media audiovisual content using skilled operators can be cost prohibitive.

SUMMARY OF THE INVENTION

The present invention is directed to a method and system for high quality semi-automatic production of customized rich media video clips. Media source material, such as text, graphics, pictures, and video clips can be submitted by a customer. A computerized content aggregator utilizing an automated production assistant can locate additional source material by searching available information libraries and databases. The computerized content aggregator may be programmed to organize and assemble the various source materials to create suggested video elements and a suggested voice-over script or recording. A human video producer can then quickly and efficiently create a rich media video clip from the suggested video elements and the voice-over script or recording.

In one aspect of the present disclosure, high quality customized rich media video clips are produced through a semi-automatic method. Media source material can initially be received over an electronic network. Available electronic information libraries can then be automatically searched for previously produced rich media video clips and rich media video clip components related to the received media source material through an automated process. Commercially available databases can also be searched for database information related to the received media source material through an automated process. The media source material, previously produced rich media video clips and/or rich media video clip components, and database information can then be automatically translated into a suggested voice-over script or recording. Suggested video elements derived from the media source material, previously produced rich media video clips and rich media video clip components, and/or database information can be automatically organized and assembled. A rich media video clip can then be created by a human operator based on the suggested voice-over script or recording and the suggested video elements.

In another aspect of the present disclosure, high quality customized rich media video clips can be produced with a semi-automatic system. The system can include a user interface configured to facilitate the transmission of media source material. A computerized content aggregator can be configured to receive the transmitted media source material. An automated production assistant in communication with the computerized content aggregator can search information libraries for previously produced rich media video clips and rich media video clip components related to the received media source material and one or more commercially available databases for database information related to the received media source material. The automated production assistant can be configured to communicate data to the computerized content aggregator in the form of the previously produced rich media video clips and rich media video clip components and/or database information it located related to the received media source material. The content aggregator can be configured to produce production instructions that include, for example, a suggested voice-over script or recording and also suggest video elements based on the data received from the automated production assistant and the received media source material. A video creation project element file can contain the production instructions and suggested video elements. A user interface can be configured to enable a human operator to utilize the video creation project element file to create a rich media video clip.

In another aspect of the present disclosure, a computer-implemented method can automatically present a plurality of selectable rich media video clips associated with goods and/or services offered for sale via an interactive networked communication system. A request to a server can be initiated at a client via the interactive networked communication system to select a plurality of rich media video clips from a database of rich media video clips associated with corresponding goods and/or services. A static descriptor can be displayed on the client for each of the plurality of rich media video clips as selected and received from the server. The plurality of rich media video clips can automatically be presented on the client in a concatenated sequence in a continuous rich media video stream. In certain embodiments, a special offer associated with the corresponding good and/or service for one or more of the rich media video clips can be presented together with the corresponding ones of the rich media video clips.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follows more particularly exemplify these embodiments.

DETAILED DESCRIPTION OF THE INVENTION

Figure 1:
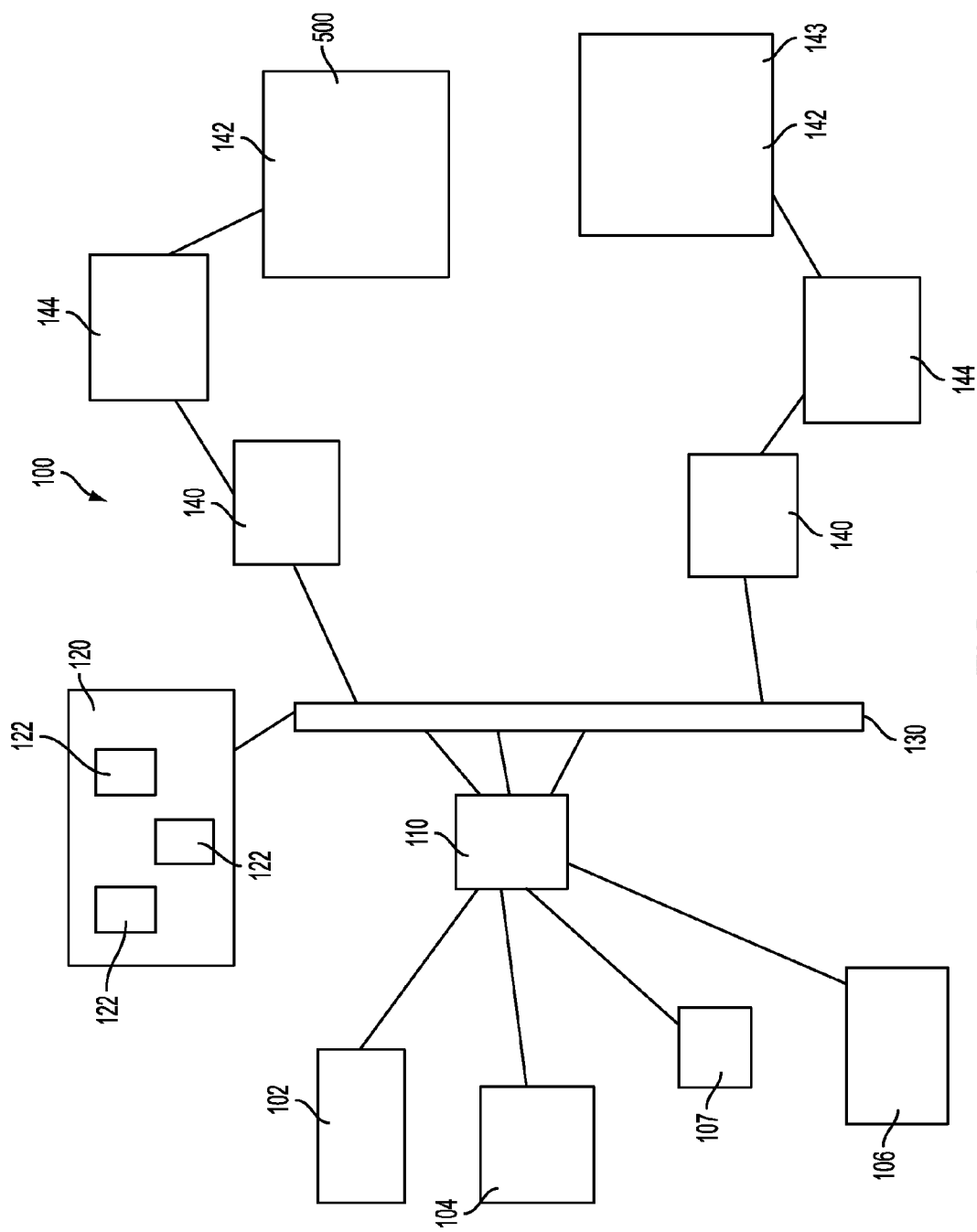
FIG. 1 is a diagram illustrating a method and system for high quality semi-automatic production of customized rich media video clips according to an embodiment of the present invention.

FIG. 1 is a diagram illustrating a method and system 100 for high quality semi-automatic production of customized rich media video clips. Rich media, as the term is used in this invention, may be exemplified by a broad range of digital information consisting of any combination of audio, graphics, video, voice and animation delivered over the Internet or similar networked arrangement of electronic devices. For purposes of this invention, a clip is a set of contiguous frames of a video stream or segment, and each frame is a single, still image taken from a recorded video or video-like animation.

System 100 enables manual or semi-automated mass-customization of rich media by integrating information representing diverse input media source material into a rich media video clip that can be stored at one or more repositories and distributed on-demand over a communication network to one or more end-users situated at widely dispersed geographical locations. The input media source material may include motion video such as video vignettes captured from a camera or camcorder with or without an accompanying soundtrack, digital or digitized still images/photographs, audio such as music or speech and static or animated graphics and text or other formats which may be incorporated into rich media presentations. The rich media video clips are adapted for distribution using traditional and contemporary information transmission channels such as for example, by integration into e-mail, video streaming over the Internet, file-sharing, web-page loading, broadcasting, multicasting and pod-casting.

Referring again to FIG. 1, production of a rich media clip for a customer by a third party may be initiated by a customer in one of several ways. A customer can place an order for a rich media video clip through a networked user interface, such as via the Internet, at step 102. The customer can upload media source material and instructions for use in creating the rich media video clip via a user interface at step 104. Media source material that may be uploaded include the customer's print ads, TV spots, video clips, or a series of digital pictures. Where a customer has previously uploaded media source material, an order can be placed and a rich media video clip can be produced without the need to upload additional source material. The customer can alternatively upload rich media elements via a direct feed, such as a file transfer protocol (ftp) link, at step 106. The customer then contractually agrees that media source material sent via direct feed will initiate a rich media video clip that will be put into a customer library and onto specified websites for marketing purposes. Media source material can also be transmitted through manual e-mail, snail mail, track, or manual upload track at step 107.

In one embodiment, a "customer" is typically a seller of goods or services. The customer contacts the third party video producer in order to have a rich media video clip promoting one or more of its products developed. The customer can then place the rich media video clip onto its website where it will be viewed by potential purchasers of its products.

Figure 2:
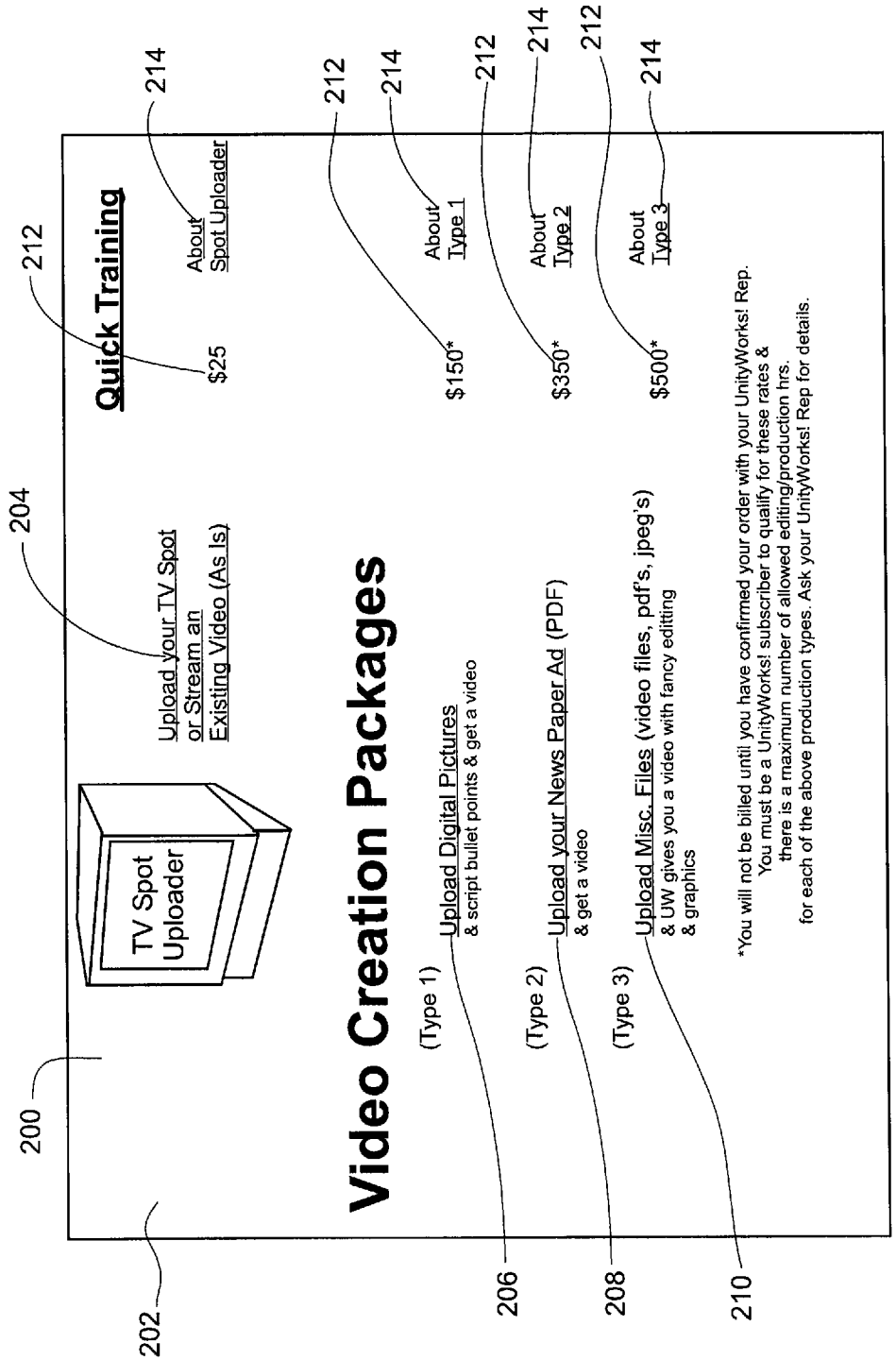
FIG. 2 is a screenshot of an order selection page of a user interface according to an embodiment of the present invention.

FIGS. 2-13 depict screenshots of a user interface 200 which can be used by the customer to upload media source material and instructions. User interface 200 will typically be accessed by a customer on a desktop or laptop computer, but can also be used on any device with a visual display that is capable of communicating over the internet, such as a personal digital assistant or a cellular phone. FIG. 2 depicts an order selection page 202. The order selection page 202 includes links 204, 206, 208, 210 for various services offered by a third party video producer. One link 204 can provide the customer with the option of uploading a TV advertisement or other pre-existing video for display. Other links can be present to provide to allow the customer to choose which type of media source material to upload for creation of a rich media video clip. For example, there can be an upload digital pictures link 206, an upload newspaper ad link 208, and an upload miscellaneous files, such as, for example, video files, pdf's, or jpeg's, link 210. In one embodiment, next to each link there can be a price listing 212 for each service as well as links 214 that describe each service in greater detail.

Figure 3:
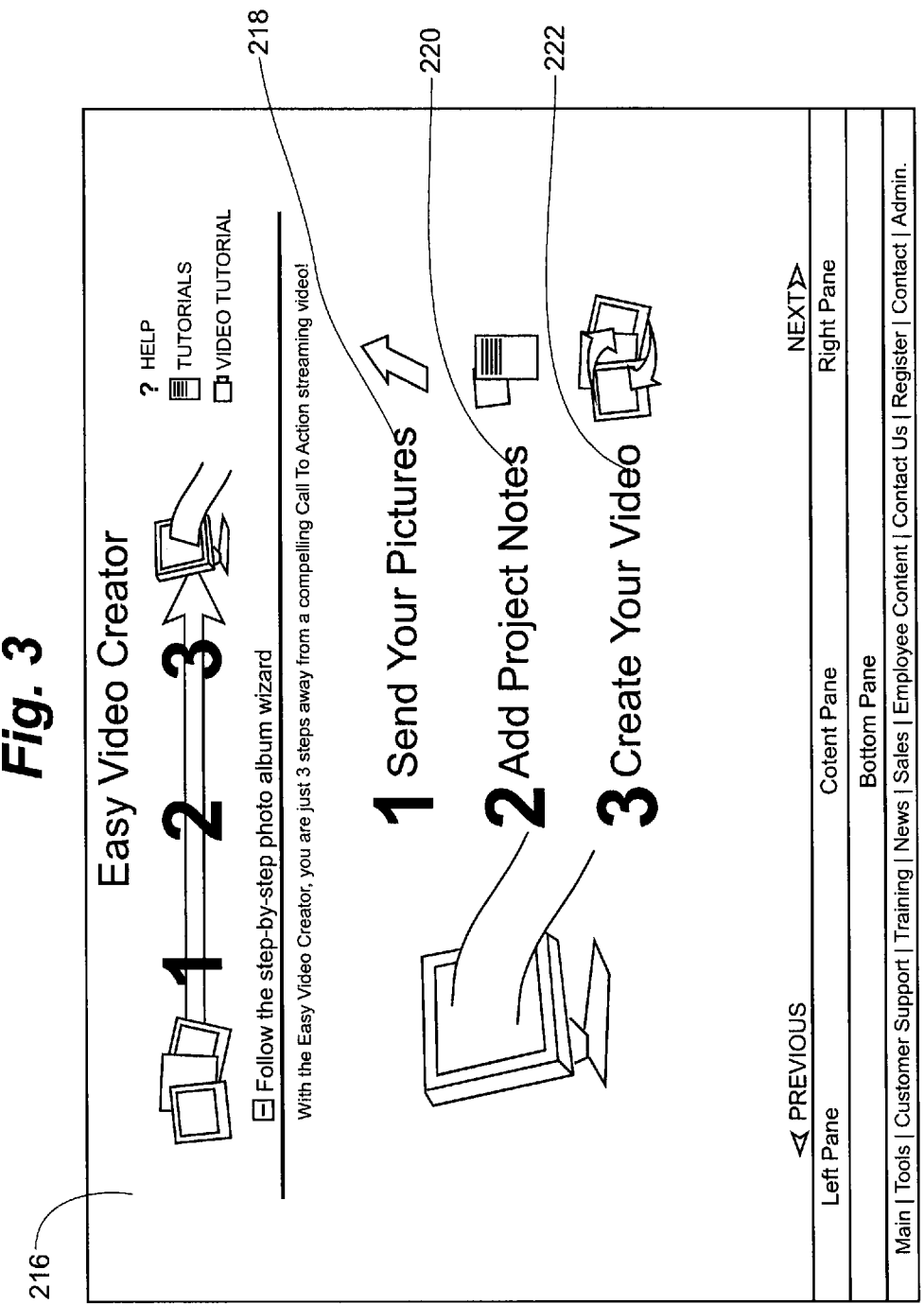
FIG. 3 is a screenshot of a start page of a user interface according to an embodiment of the present invention.

Once the customer selects a service from the order selection page 202, a start page 204 such as that depicted in FIG. 3 can appear. The start page 204 can list the steps which the customer must accomplish to begin the process of having a rich media video clip. The steps are uploading media source material 218, adding project notes 220, and creating and organizing the desired video content 222.

Figure 4:
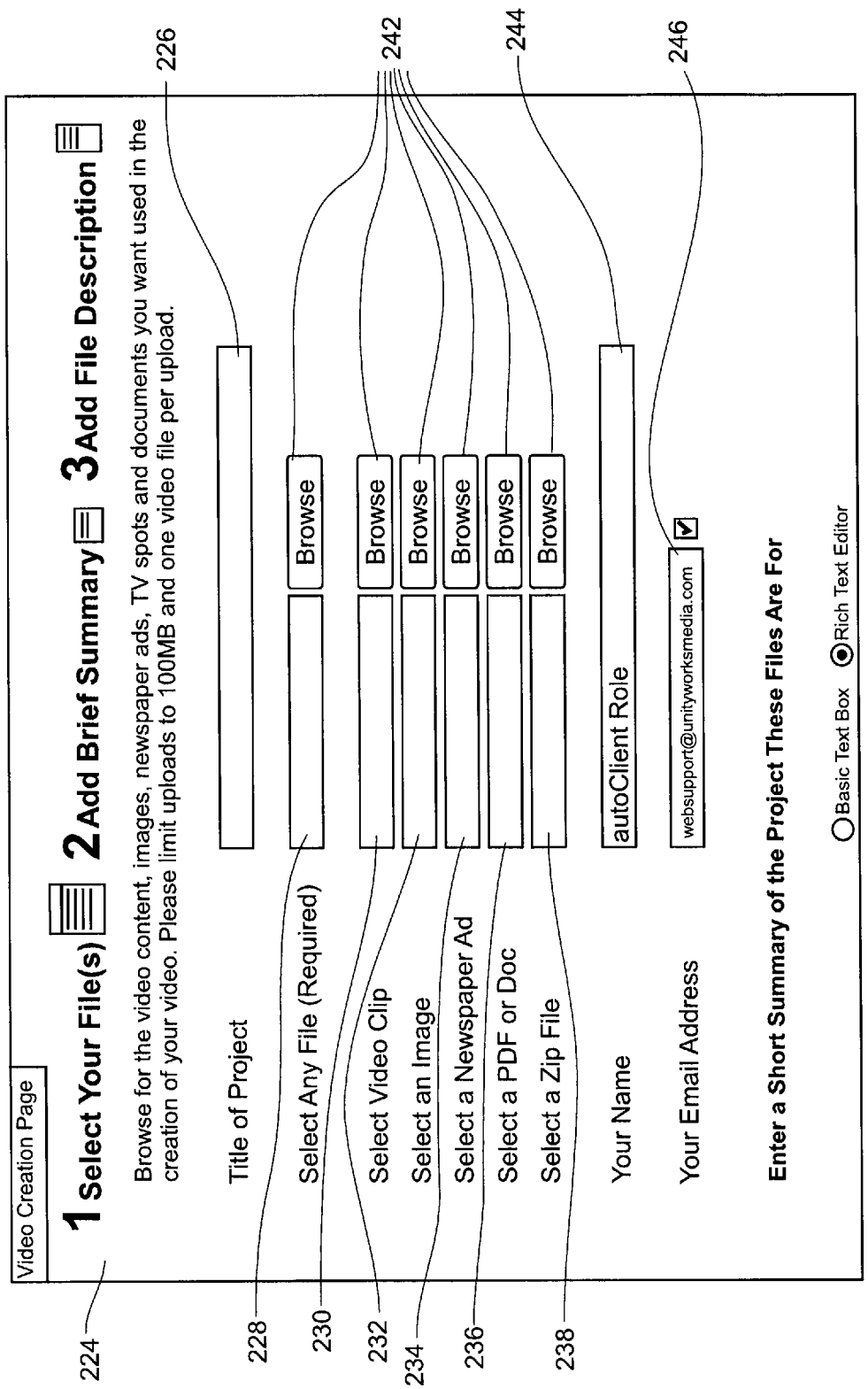
FIG. 4 is a screenshot of a file upload page of a user interface according to an embodiment of the present invention.
Figure 5:
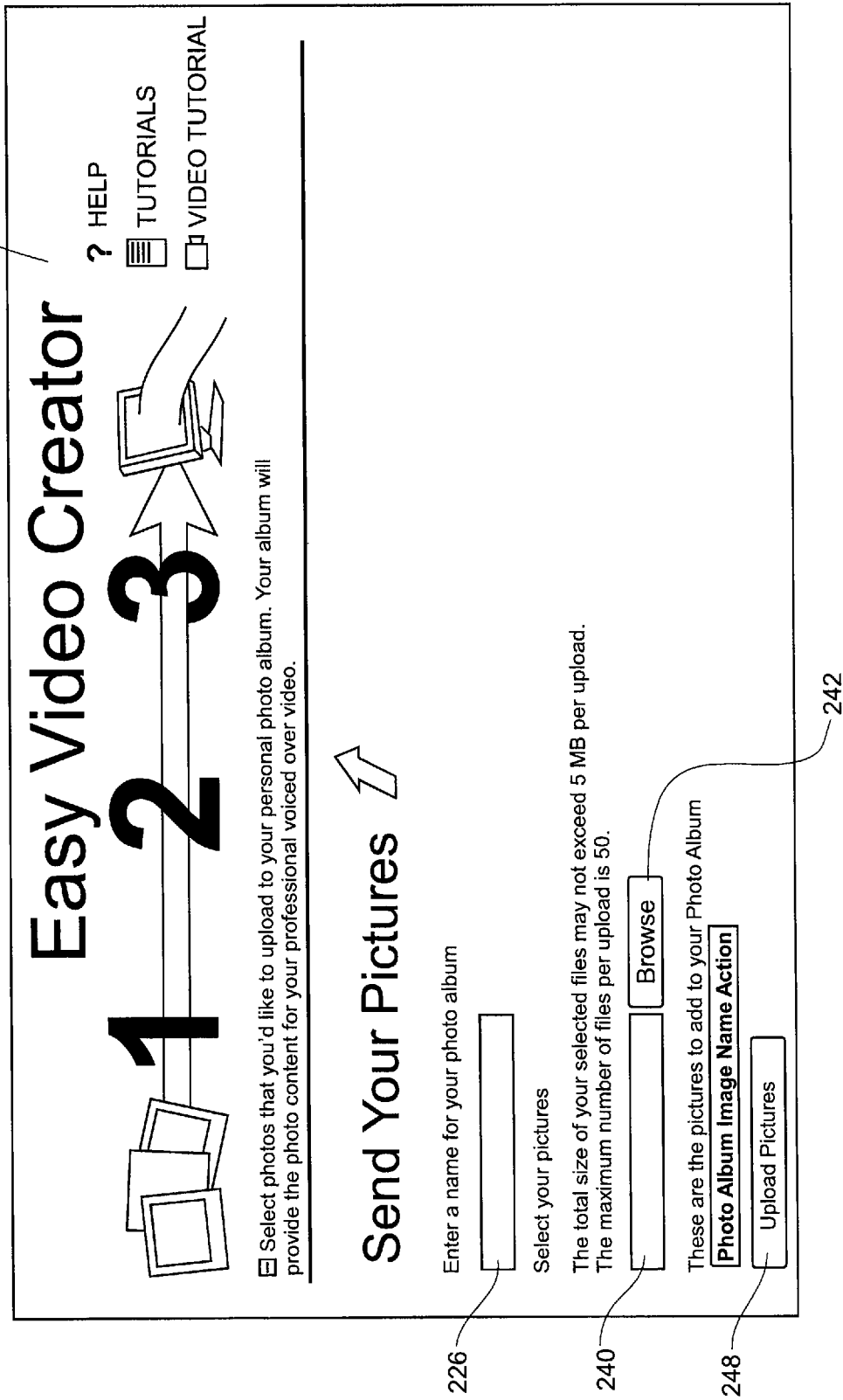
FIG. 5 is a screenshot of a file upload page of a user interface according to an embodiment of the present invention.
Figure 6:
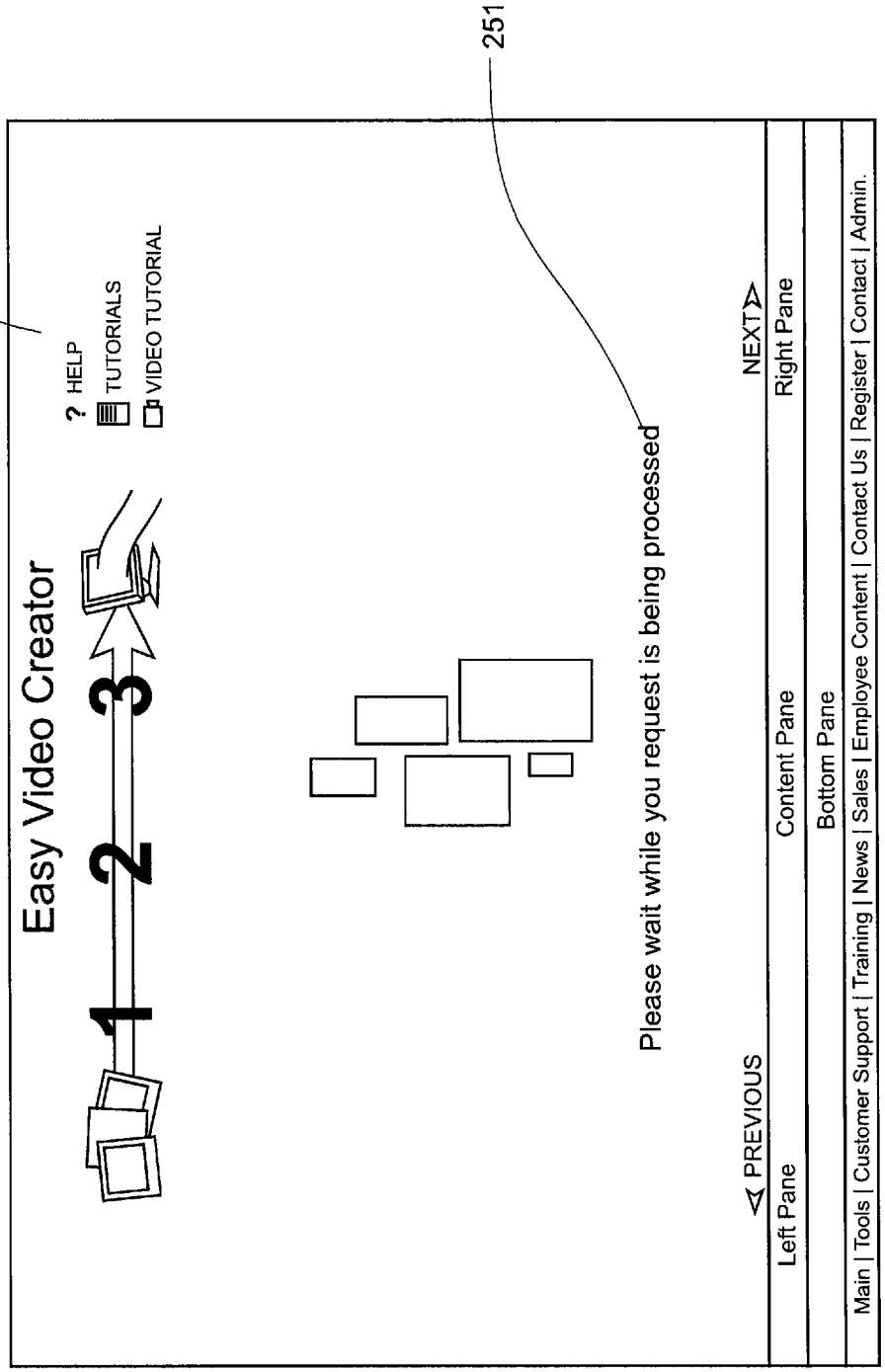
FIG. 6 is a screenshot of a processing screen of a user interface according to an embodiment of the present invention.

The customer can then advance to a file upload page 224, such as one of the file upload pages 224 depicted in FIGS. 4 and 5. File upload page can include a title box 226 for entering a name for the project. Depending on the type of project selected by the customer, various selection boxes 228-240 can appear on the file upload page 224. For example, an any file box 228, a video clip box 230, an image box 232, a newspaper ad box 234, a pdf or doc box 236, and a zip file box 238 can be present to allow for the uploading of the various listed file types. Alternatively, where only digital pictures are being uploaded, the file upload page 224 can include only a digital picture box 240 (FIG. 5). Each selection box 228-240 can include a browse button 242 to allow the customer to locate the desired file on the customer's system. The file upload page 224 can also include boxes into which the customer can insert its name 244 and email address 246. The selected files can be uploaded by pressing an upload files button 248.

Figure 7:
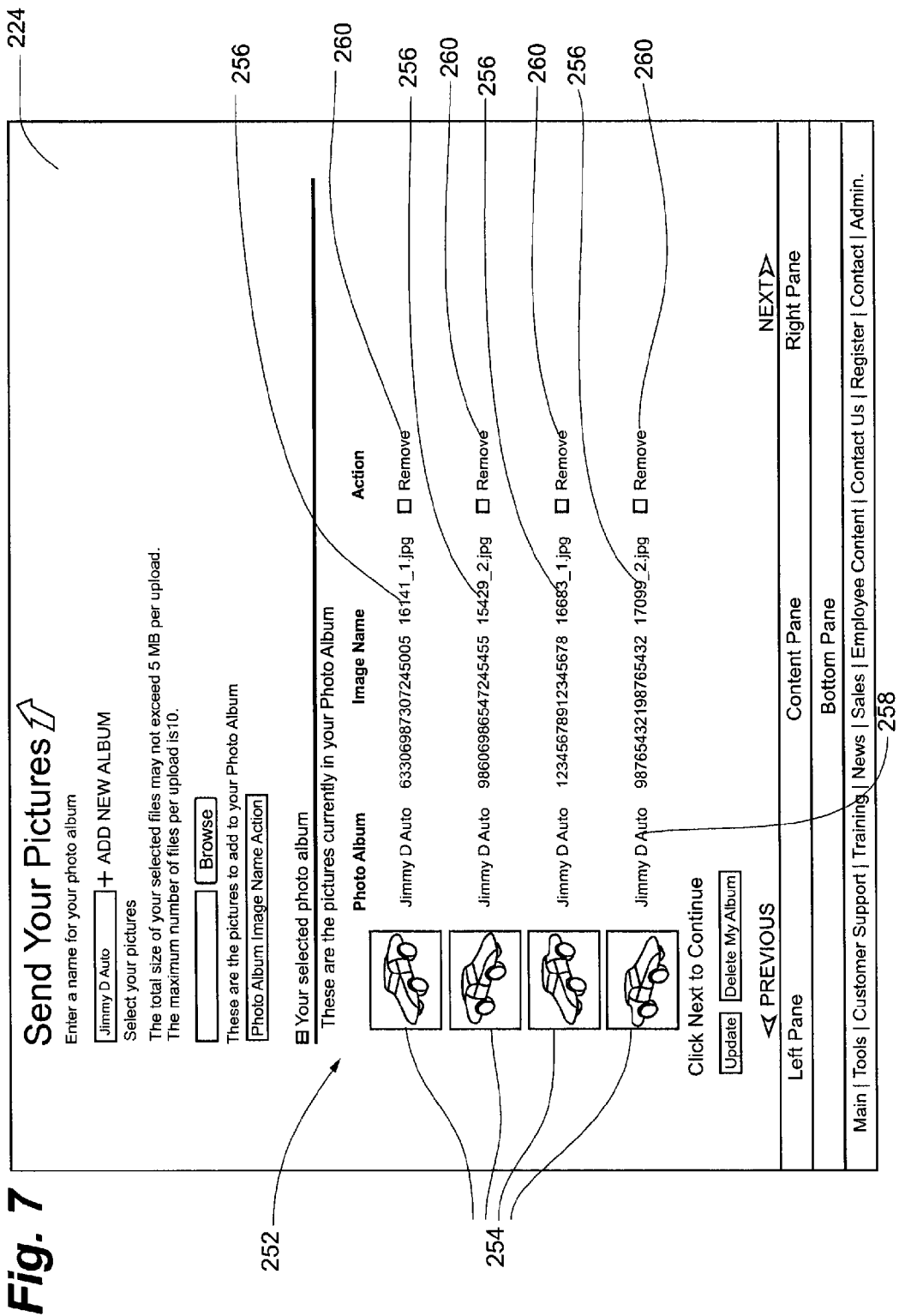
FIG. 7 is a screenshot of a file upload page of a user interface according to an embodiment of the present invention.

As files are uploaded, a processing screen 250 (FIG. 6) may appear to display a processing message 251 to inform the customer that its files are in the process of being uploaded. As each file is uploaded, the upload file page 224 can be updated to reflect the uploaded files as shown in FIG. 7. The upload file page 224 can provide a list 252 of the uploaded files. The list 252 can include a thumbnail 254 and the name of the file 256 as well as the title of the project 258 that the file belongs to. A file can be removed from the list of uploaded files by use of a cancel or remove feature 260.

Figure 8:
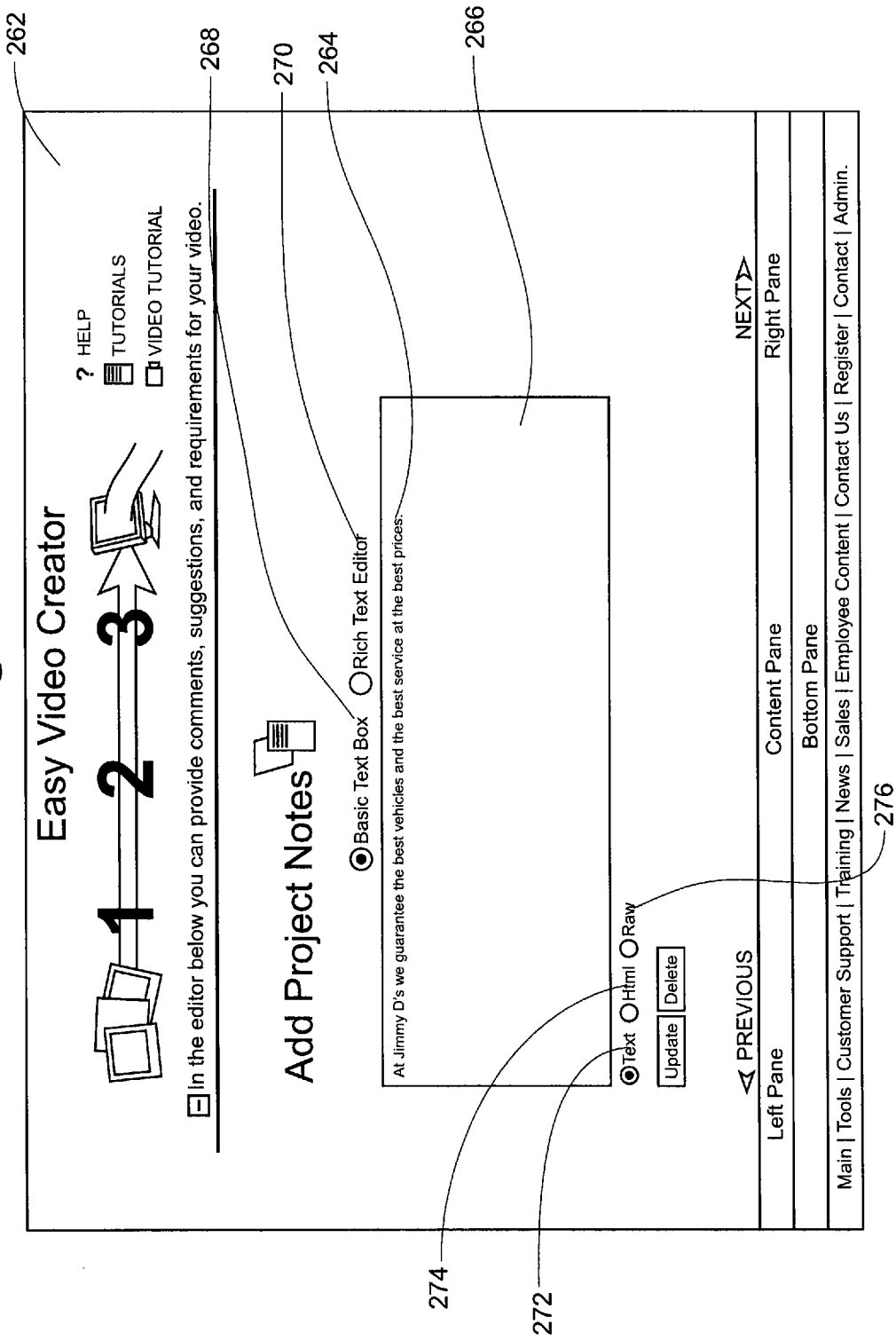
FIG. 8 is a screenshot of a project notes page of a user interface according to an embodiment of the present invention.

After the customer has uploaded all of the files it wishes to submit, the customer can move on to the add project notes step 220 at an project notes page 262 such as that depicted in FIG. 8. Project notes 264 can be added in a notes box 266. The project notes page 262 can allow the customer to select either a basic text box option 268 or a rich text editor option 270 for entering its project notes. The customer can also select from various data format options, such as a text option 272, an html option 274, or a raw option 276 to specify the format in which it wishes to enter the data that comprises its project notes.

Figure 9:
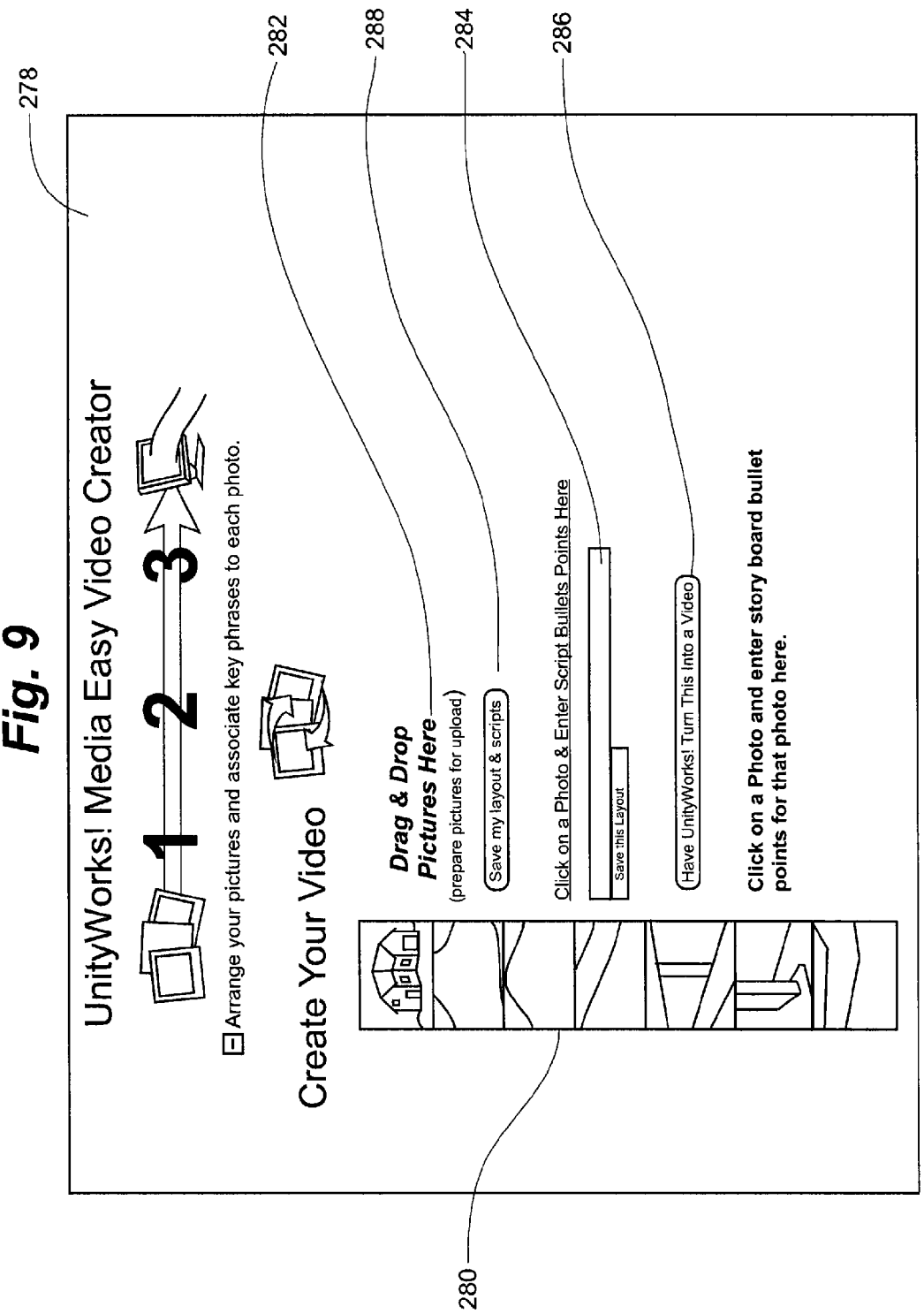
FIG. 9 is a screenshot of a create video page of a user interface according to an embodiment of the present invention.
Figure 10:
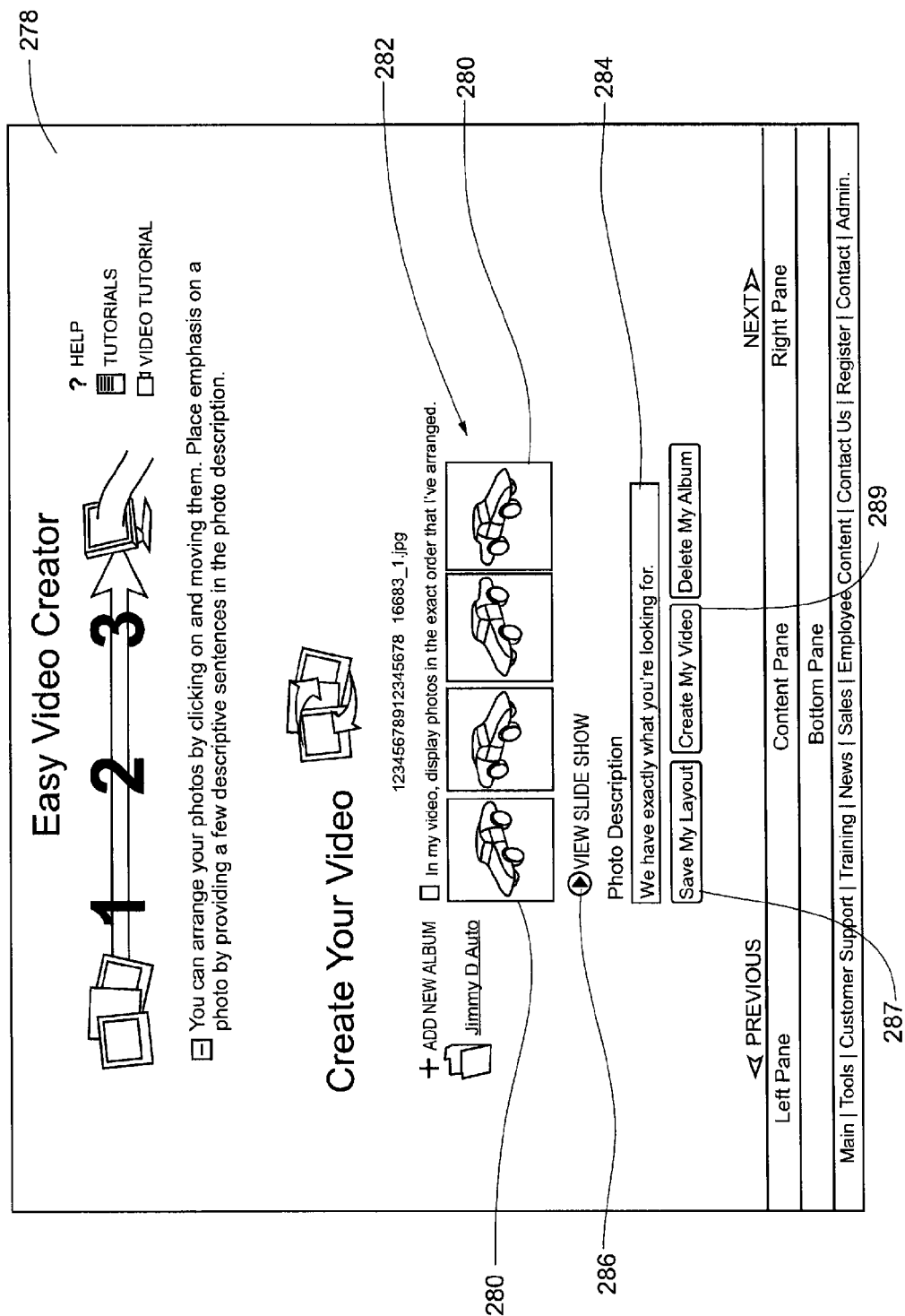
FIG. 10 is a screenshot of a create video page of a user interface according to an embodiment of the present invention.
Figure 11:
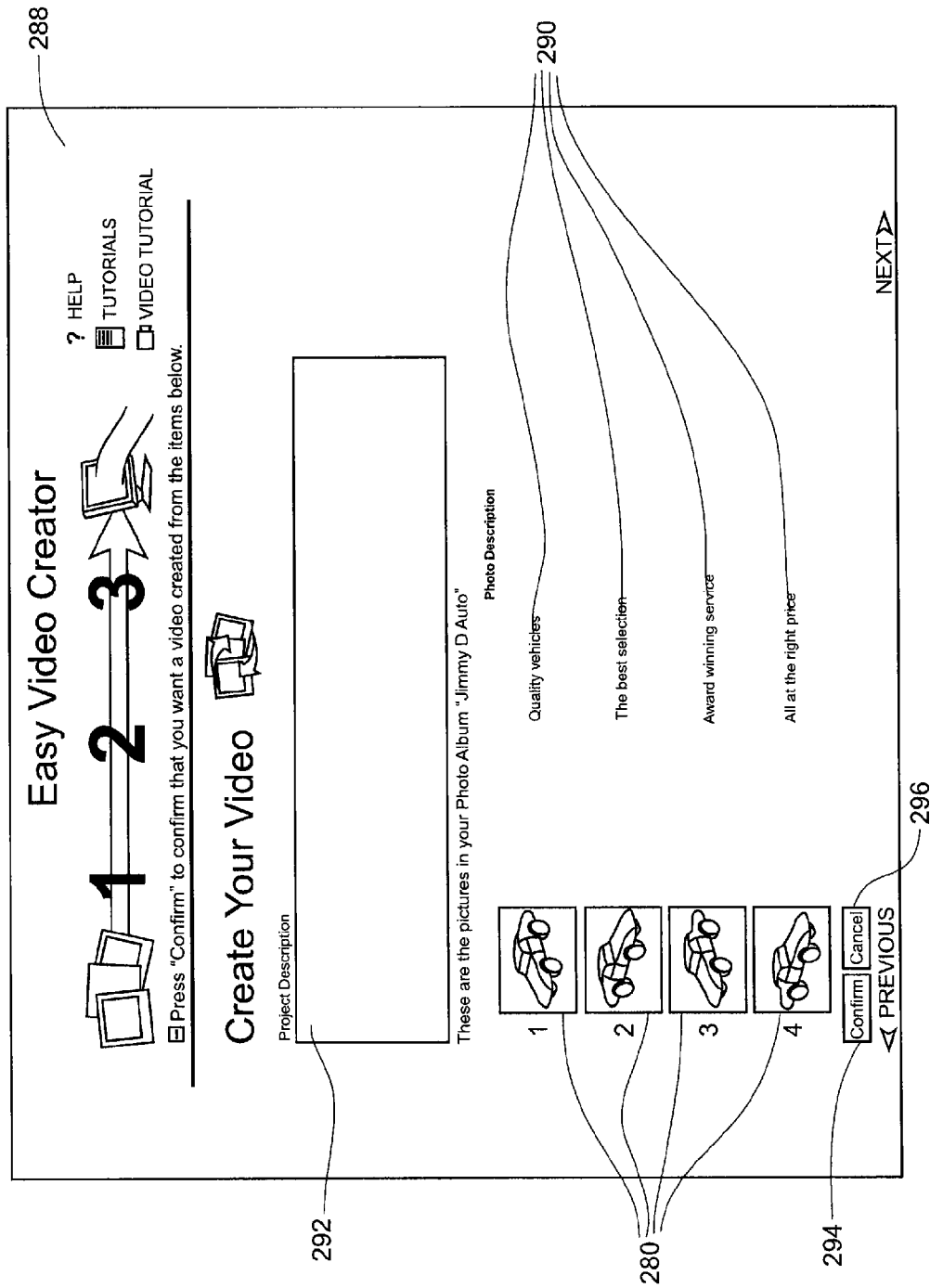
FIG. 11 is a screenshot of a create-video confirmation page of a user interface according to an embodiment of the present invention.

Referring now to FIGS. 9-11, once the customer has added its project notes, the customer can proceed to the step of creating its video 222. Where the customer has uploaded multiple files to be used in the creation of a video production, thumbnails 280 of the files can be put into the order the customer wishes them to appear in the rich media video clip on a create video page 278. The thumbnails 280 can be arranged by various methods, including dragging and dropping them in the desired order into a designated area 282 or by designating a number for each thumbnail 280 representing the order in which it is to appear. In one embodiment, a description can be associated with each file by clicking on the file's thumbnail 280 and entering text into a photo description box 284. The create video page 278 can also include a view slideshow link 286 that allows a customer to view a slideshow of its files in the selected order. The selected order can be saved with a save layout button 288. Once the customer is satisfied with the layout and description of its files, it can click on a create video link 289.

When the create video link 286 is selected, a create video confirmation page 288 can appear. Create video confirmation page 288 can include the thumbnail 280 of each file in the selected order. The description 290 associated with each file can be located adjacent to its respective thumbnail 280. The project notes 292 for the project can also be displayed on the create video confirmation page 288. The description 290 and project notes 292 can later be used to develop a script for a voiceover to be used with the rich media video clip. The customer can confirm an order by clicking the confirm button 294. If the customer wishes to change or cancel an order, the customer can click the cancel button 296.

Figure 12:
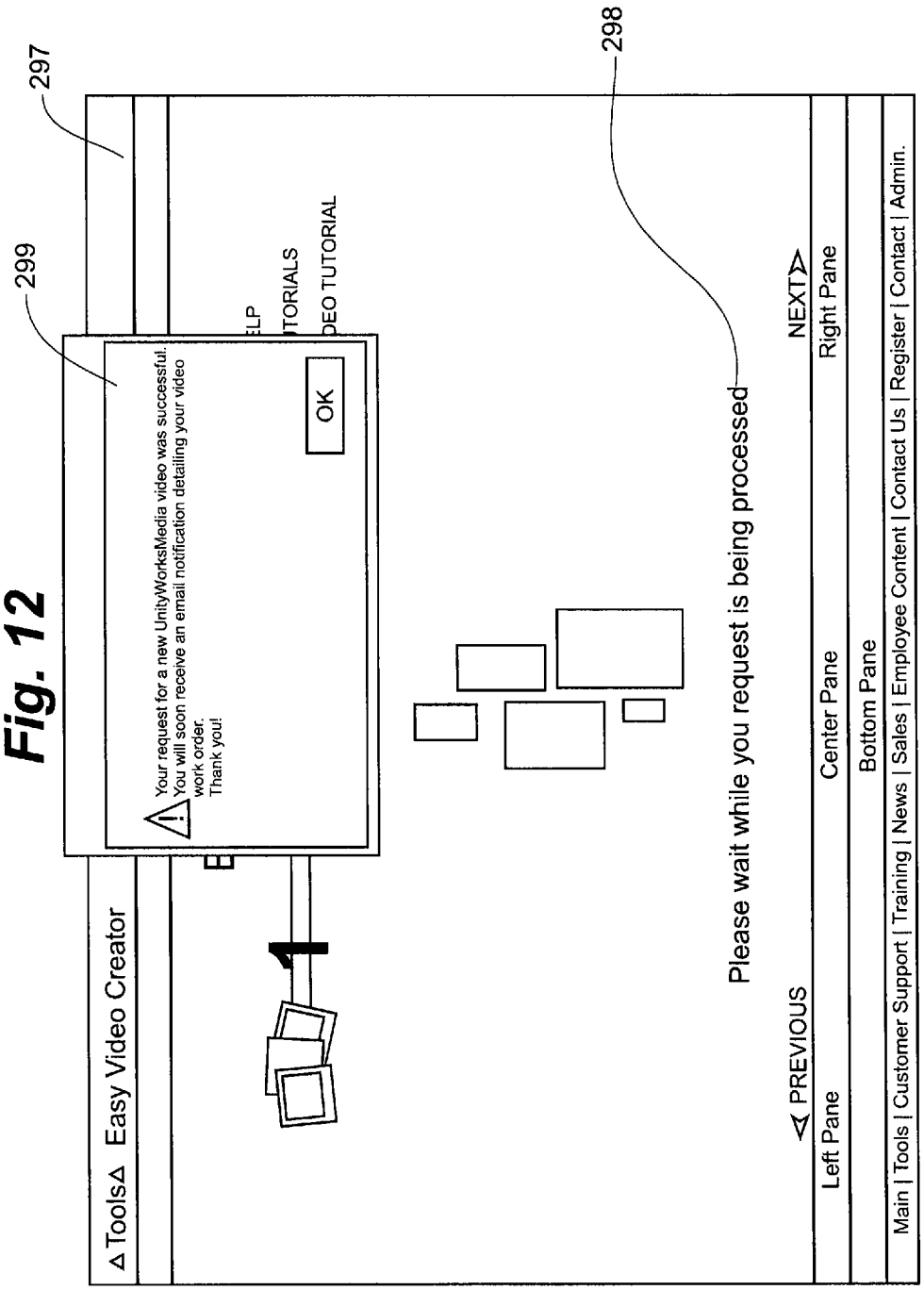
FIG. 12 is a screenshot of a processing page of a user interface according to an embodiment of the present invention.
Figure 13:
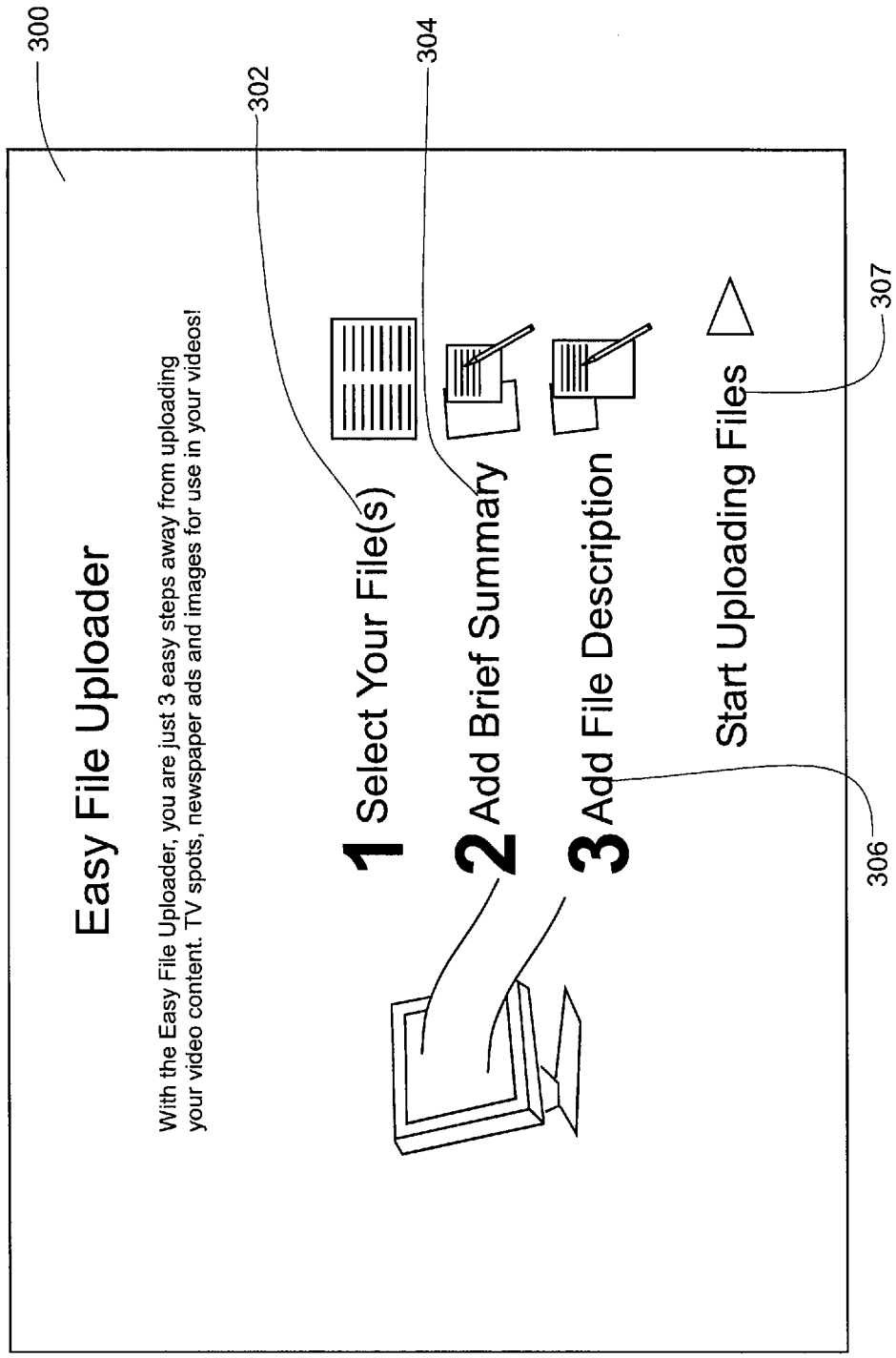
FIG. 13 is a screenshot of a file upload page of a user interface according to an embodiment of the present invention.

Once the customer has confirmed an order, a processing page 297 can appear with a message informing the customer that the order is being processed 298 while the order is communicated to the third party video producer (FIG. 12). Once the third party video producer has received the order, a pop-up confirmation message 299 can appear to confirm that the order has been received.

The above steps taken by the customer to submit files and instructions can be done in a sequential order in order to provide complete information to the third party video producer. This provides for a more organized submission and allows for faster video production by the third party video producer. Alternatively, the customer may complete only some of the steps. For example, the customer can access a file upload page 300 from which the customer only selects files for upload 302, adds a brief summary of the project 304, adds a description of the files 306, and uploads the files 307. The third party video producer will then fill in the gaps in the information received, such as project notes or arrangement of files, to create a rich media video clip. Similarly, if a customer submits files in an unorganized fashion, such as by attaching them to an email, the third party video producer will generate any additional information necessary to produce a rich media video clip.

Referring again to FIG. 1, the customer's instructions and uploaded media source material are transferred over a network 110 and received by a computerized content aggregator 130. The content aggregator 130 is programmed to review the various input from the customer and exercises logic to translate the input into appropriate work orders and production instructions for submission to the third party video producer.

In one embodiment, the computerized content aggregator 130 includes an automated production assistant 120 that is programmed to utilize various automated processes and libraries 122 to aid in organizing and serving up suggested video elements that the third party video producer can use to create a rich media video clip. The automated processes and libraries 122 can include pre-produced intro and outro segments designed for ads of the specific customer, clips, voiceovers, and script templates previously produced for the customer, and an automated script developer tool. The production assistant may also be programmed to access various databases that contain descriptive information uniquely identified with the product that is the subject of the customer's order.

In one example embodiment, a VIN database includes information about specific cars or an MLS database includes information about specific real estate properties. In such databases, a unique identifier corresponds to each item in the database. When the unique identifier is entered into the computerized content aggregator, the automated production assistant may be programmed to access these databases to obtain further information, such as description or images, on the features of the corresponding item. This information can then also be used in selecting and constructing the suggested video elements packaged for the third party video producer.

In another example embodiment, databases of the customer's products or services and prepared marketing and rich media materials, as well as databases of the customer's customer lists, may be automatically accessed and compared as part of the process executed by the automated production assistant. In another aspect of this embodiment, the completed rich media clips may be automatically emailed to a selected subset determined from the customer's customer database to match attributes corresponding to the particular work order used to generate the customized rich media clip. For example, the work order may specify that a recipient of the email containing the rich media clip may be entitled to a special offer on a new vehicle if they are willing to trade in their existing vehicle. In this example, the recipients may be selected from the customer list for those recipients who have an existing vehicle that matches the desired criteria of, for example, a used vehicle for which there is a current increased demand.

Figure 14:
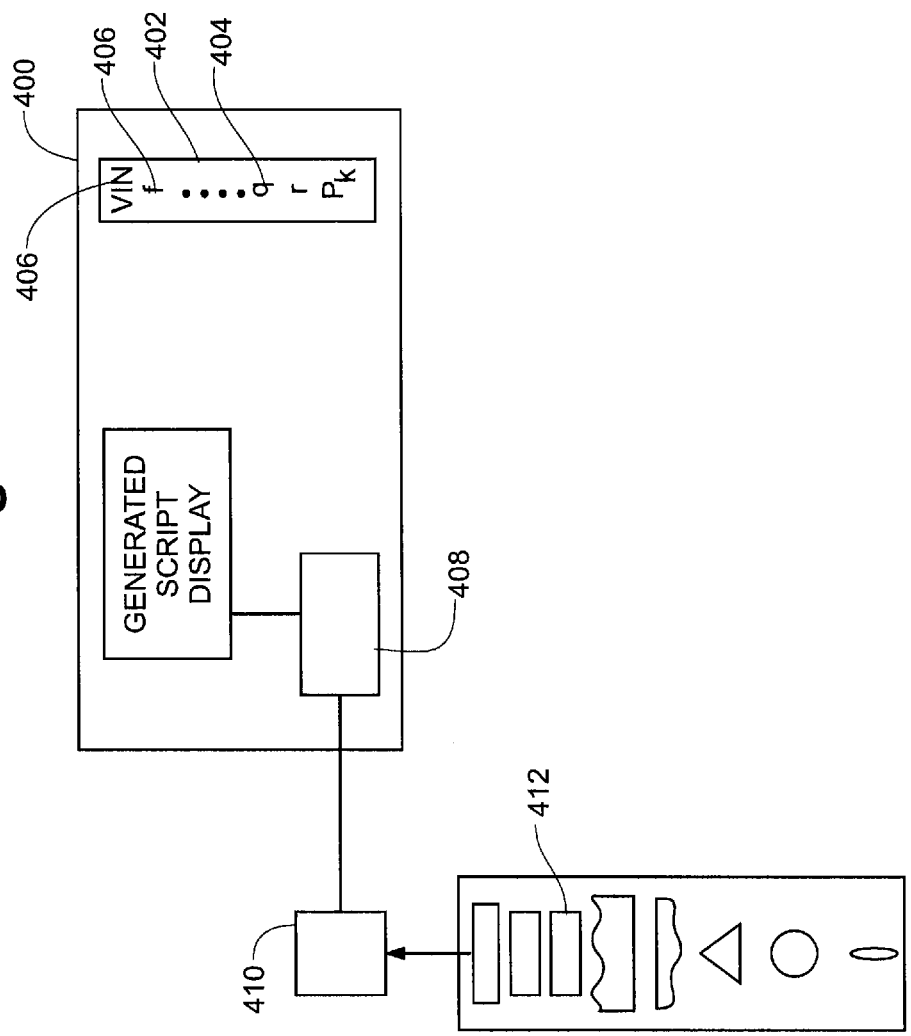
FIG. 14 is a block diagram illustrating the operation of the automatic script generator according to an embodiment of the present invention.

FIG. 14 is a block diagram illustrating the operation of one embodiment of the automatic script generator 400 that can be utilized by the automated production assistant 120. As seen in FIG. 14, block 402 represents a feature vector 404 for the rich media video clip after it is populated with select alphanumeric descriptors 406. The select alphanumeric descriptors are generated based on the file descriptions 290 submitted by the customer and/or the feature descriptions obtained from a proprietary database. In one embodiment, the automatic script generator 400 includes a natural language processor 408 communicating with a database 410 comprising a plurality of templates 412. Each template is a lexically meaningful sentence of connected words which include the alphanumeric descriptor or descriptors 406 corresponding to each file or feature description. Each file or feature may be associated with a plurality of templates and each template may represent a variant of a sentence in a selected language. Each variant of the sentence creatively conveys the essence of the associated file or feature with a slant tailored to a particular promotion related theme.

In one embodiment, a natural language processor 408 collects the set of sentences corresponding to the plurality of templates 412 associated with the alphanumeric descriptors 406 populating the feature vector 404 and generates a text message or script that is substantially grammatically correct by using natural language processing principles well known in the art. In one embodiment, the script is uploaded to a script library accessible to the automated production assistant 120 and catalogued for easy search using a search key derived from the feature vector 404. A future rich media video clip order that leads to an occurrence of the feature vector 404 may trigger the retrieval of script from the script library into computerized content aggregator 130 instead of triggering the automatic script generator 400.

The content aggregator 130 places the suggested video and script elements in a video creation project element file 140 which is transmitted to the third party video producer. A human operator 144 at the third party video producer can then import the video creation project element file 140 into a user interface 142. User interface 142 can be a user interface 144 of any known commercially available video production software, such as, for example, MovingPicture software from StageTools LLC. Alternatively, user interface 142 can be a user interface 500 of a proprietary video production software of the third party video producer.

Figure 15:
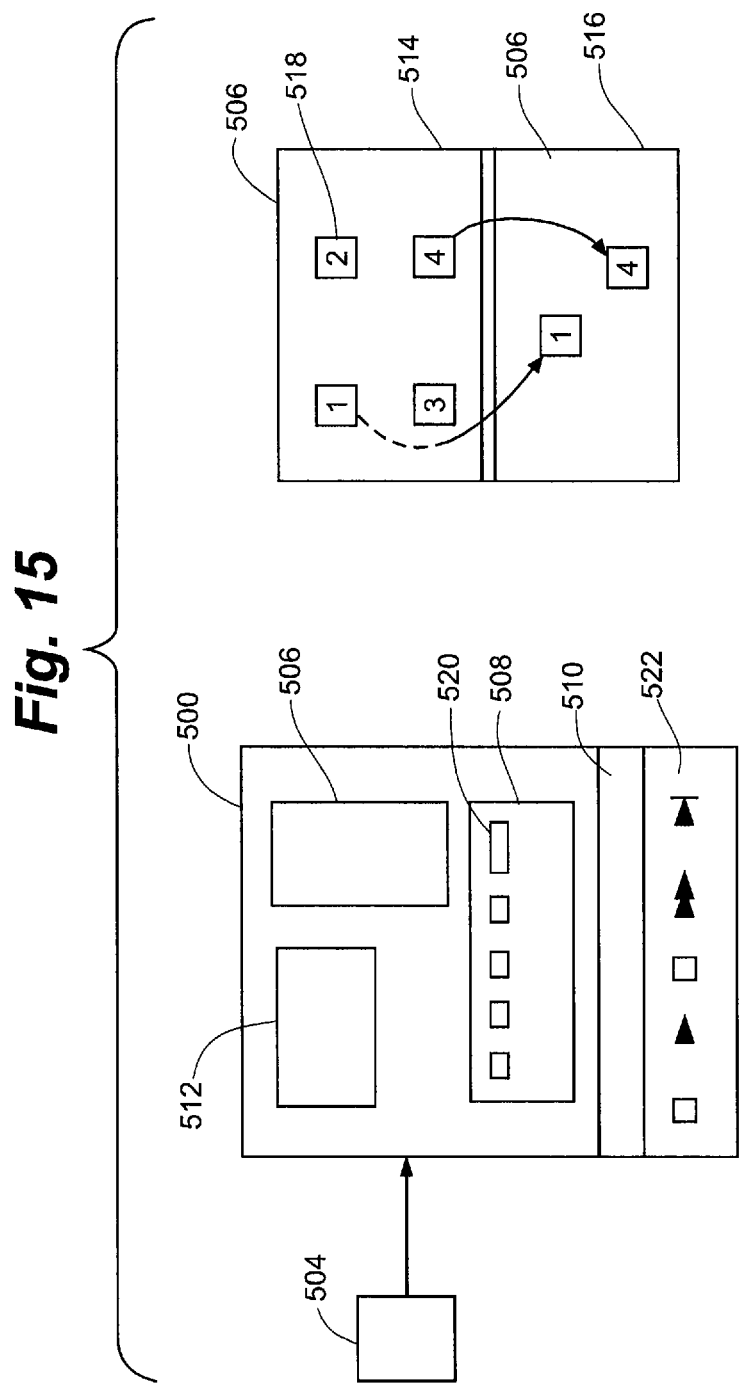
FIG. 15 depicts an edit mode of a user interface of an embodiment of the present invention.

FIG. 15 depicts an edit mode of a proprietary user interface 500 that provides the edit controls 502 necessary to affect the transformation of the selected video elements from the video creation project element file 140 into a rich media video clip. User interface 500 is provided with intuitive controls such that an operator 144 can quickly and efficiently produce a rich media video clip based on decisions made by the human operator 144, and in some embodiments, a customized voice over recorded by the human operator 144, without the need for specialized training.

In one embodiment, user interface 500 is configured with an input box 504 for operator input of an alphanumeric input representing a unique database identifier, a review area 506, a storyboarding area 508, playback area 510 and a teleprompter area 512. Review area 506 has a first region 514 and a second region 516. First region 514 presents the operator 144 with thumbnail icons 518 characterizing the selected video elements and script. Exemplary thumbnail icons 518 include a still images icon, a motion video icon, an audio track icon and a script track icon. The absence of one or more types of selected video elements may cause the icon 518 corresponding to that type of media to not display in the first region 514. Other equivalent means can be used to indicate the presence or absence of a particular component. Operator selection of, for example, the still images icon, causes the selected still digital photographs (i.e. frames) to display in the second region 516 of the review area 506. Operator 144 can construct a key frame set 520 by transferring (e.g. by dragging the frames) a selected number of the still digital photographs (or frames) to the storyboarding area 508. Operator selection of a motion video icon will cause a video vignette of the selected frames to play in the playback area 510. Playback controls 522 may also be used to adjust the frame speed and a rectilinear cursor may be used to grab a thumbnail 518 and cause it to be added to the key frame set 520. The operator 144 can edit the key frame set 520 by using intuitive frame-edit controls in the storyboarding area 508.

Editing software 550 can take as input the key frame set 520. In one embodiment of FIG. 16, the editing software 550 may be either linear or non-linear. In one embodiment, the editing software 550 is a component of a virtual 'studio in a box' hardware-software package, such as Creation Station solution by UnityWorks! Media, the assignee of the present invention. Creation Station comprises a video camera and green screen lights in addition to the editing software 550 and provides full video production, editing and streaming capabilities.

Figure 16:
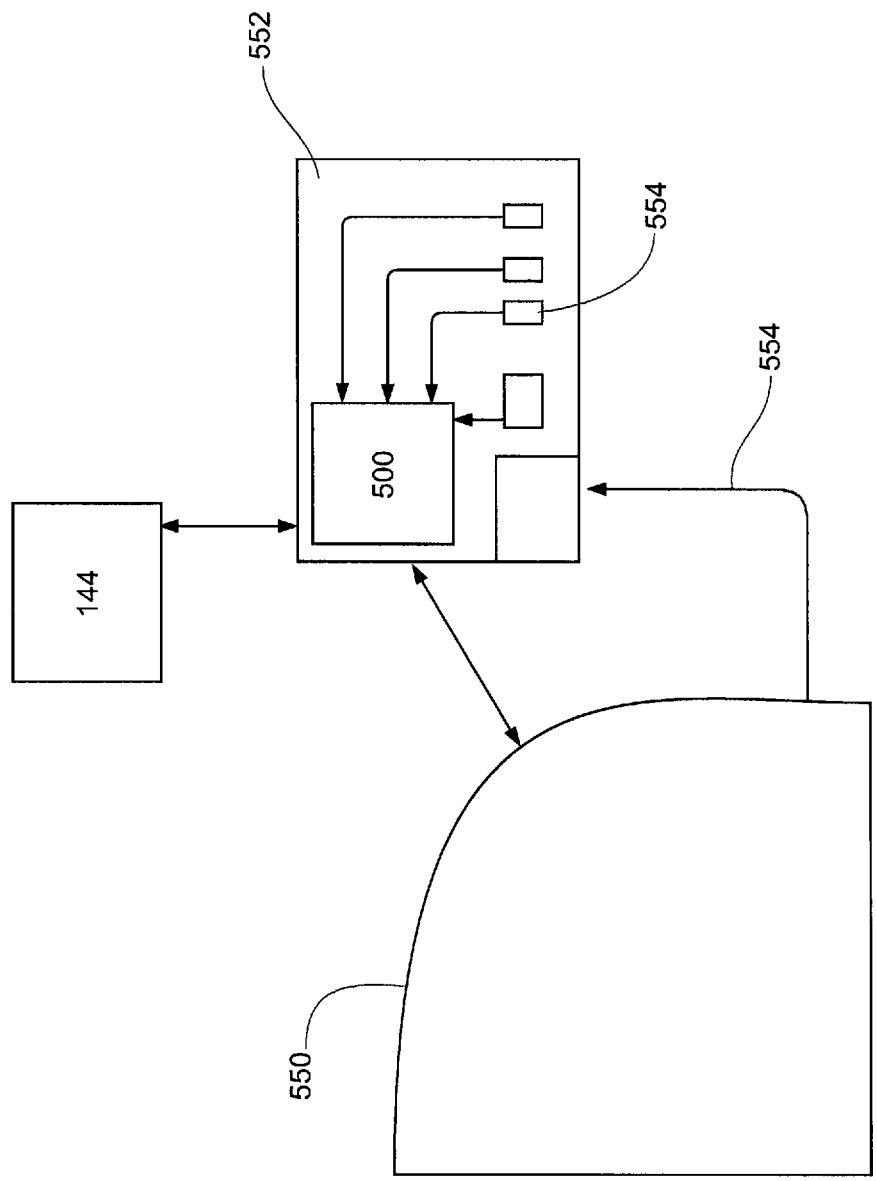
FIG. 16 is a diagram illustrating the editing software of an embodiment of the present invention.

In an example embodiment illustrated in FIG. 16, editing software 550 is operable in a semi-automatic mode, i.e. through the intermediation of the operator 144 interacting with the editing software 550 through the user interface 500 displayed on a display device 552 of a computer. The editing software 500 "stitches" still frames 554 or other video elements in the key frame set 520 into a rich media video clip by adding dynamic motion through a predefined set of motion-effects. Exemplary motion-effects include still, pan, tilt, zoom, cut, wipe, fade and dissolve. Each still frame is subjected to one or more of motion effects to create animated sub clips. In effect, each motion effect involves creating a sequence of sub-frames from the single frame representing the still frame. The sequence of sub-frames represent periodic snapshots of the view within a window bounding a limited region of the still frame while the window is 1) moved continuously in a horizontal direction over the still frame in either a left or a right direction (i.e. panning) and/or 2) tilted continuously up or down in a vertical direction (i.e. tilting) and/or 3) scaled continuously to zoom in and/or zoom out. Animated sub clips associated with the key frames may be "stitched" together into a rich media video clip through appropriate cuts, wipes, fades and dissolves. Finally, an intro segment can be pre-pended to the rich media video clip and an outro segment can be appended to the rich media video clip to generate a broadcast quality video.

In another embodiment, video editors such as Adobe Premiere or Avid Xpress DV may be used for rendering the combination of the rich media video clip, the intro segment and the outro segment into the broadcast quality video. The playback area 510 of the proprietary user interface 500 also provides the facility to render the video. The operator 144 may iteratively modify the video when needed using the editing software 550. In one embodiment, the editing software 550 is configured to adjust the media effects employed to generate the rich media video clip so that the total playtime of the broadcast quality video is less than about a minute, such as about 42 seconds.

Figure 17:
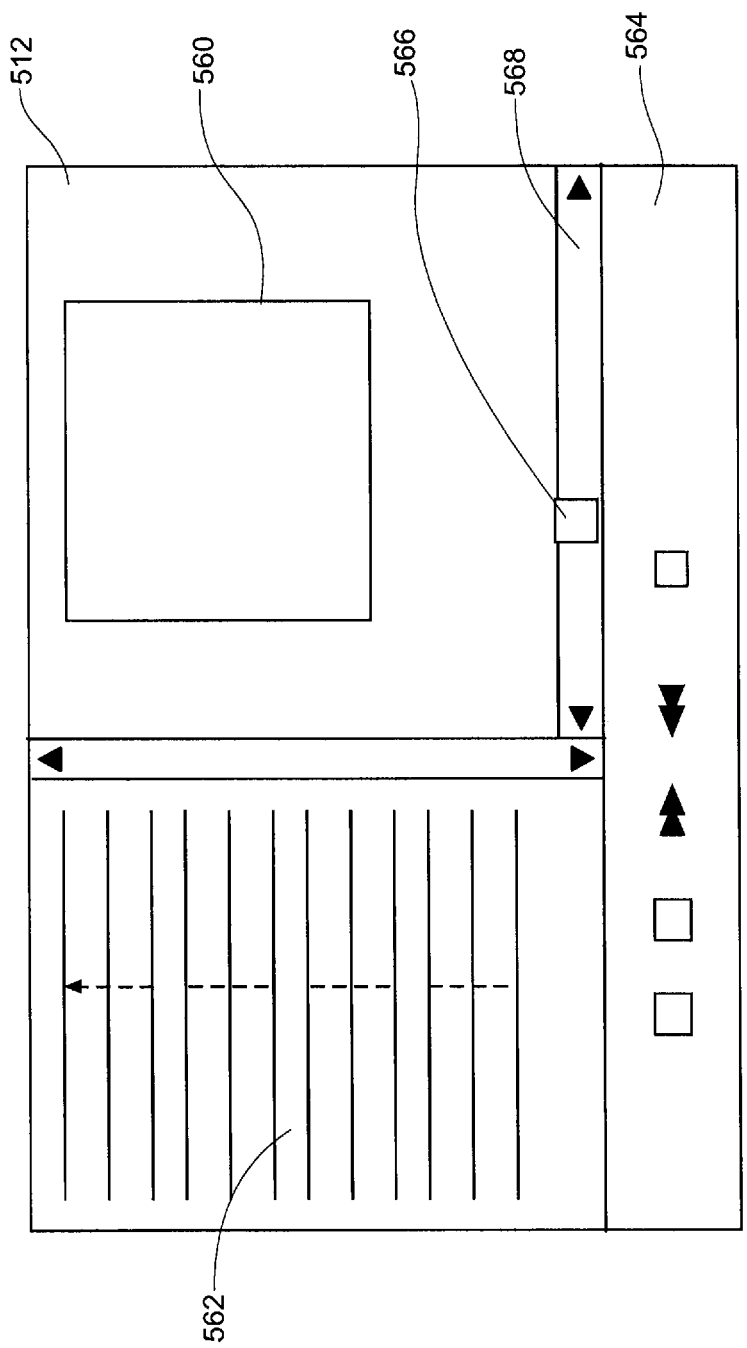
FIG. 17 depicts a teleprompter area of the editing software according to an embodiment of the present invention.

FIG. 17 exemplifies one embodiment of a teleprompter area 512. Upon operator activation of the audio track icon 560, the script 562 generated by the automated production assistant 120 is displayed in the teleprompter area 512. User activated controls 564 in the teleprompter area 512 may be used to adjust the rate at which the script 562 may be displayed or scrolled, for example. A slider control 566 is provided where the length of the slot 568 represents 100% of the time duration to scroll the current script 562 in its entirety. The slider control 566 can be moved left or right by the operator 144 to vary the time at which playback of the video is automatically initiated relative to the scrolling duration of the script 562.

In one embodiment, the operator, such as a person who has been professionally voice trained, reads the script 562 as it scrolls in the teleprompter area 512 to create a voice-over capsule. Alternatively, the script 562 can be displayed in a static presentation. Operator selection of a voice over icon in the user activated controls 564 initiates a recording of the operator's voice. The playback of the video contemporaneous with the scrolling of the script 562 provides a visual cue to help the operator adjust the pace of delivery and the tone of voice to the contents of the video. Once recorded, the voice-over capsule may be replayed to synchronize it with the video. The editor software 550 combines the audio of the voice-over capsule with the video of the rich media promo to generate a broadcast quality advertisement. Alternatively, instead of an operator reading script 562 to generate the voice over, editing software 550 can be adapted to automatically generate the voice over. Editing software 550 can auto-generate a simulation of a human voice for the voice over using human voice simulation techniques commonly known in the art. As a further alternative, editing software 550 can be adapted to stitch together pre-recorded words or phrases to create the voice over.

In an alternate embodiment, the voice-over capsule is created before the creation of the rich media video clip and the duration of the audio in the voice-over capsule defines the total playtime of the rich media promo. Irrespective of whether the voice-over capsule is created before or after the rich media promo, the total time it takes the operator 144 to create a broadcast quality advertisement is less than about ten minutes and in one embodiment is less than two to three minutes.

Figure 18:
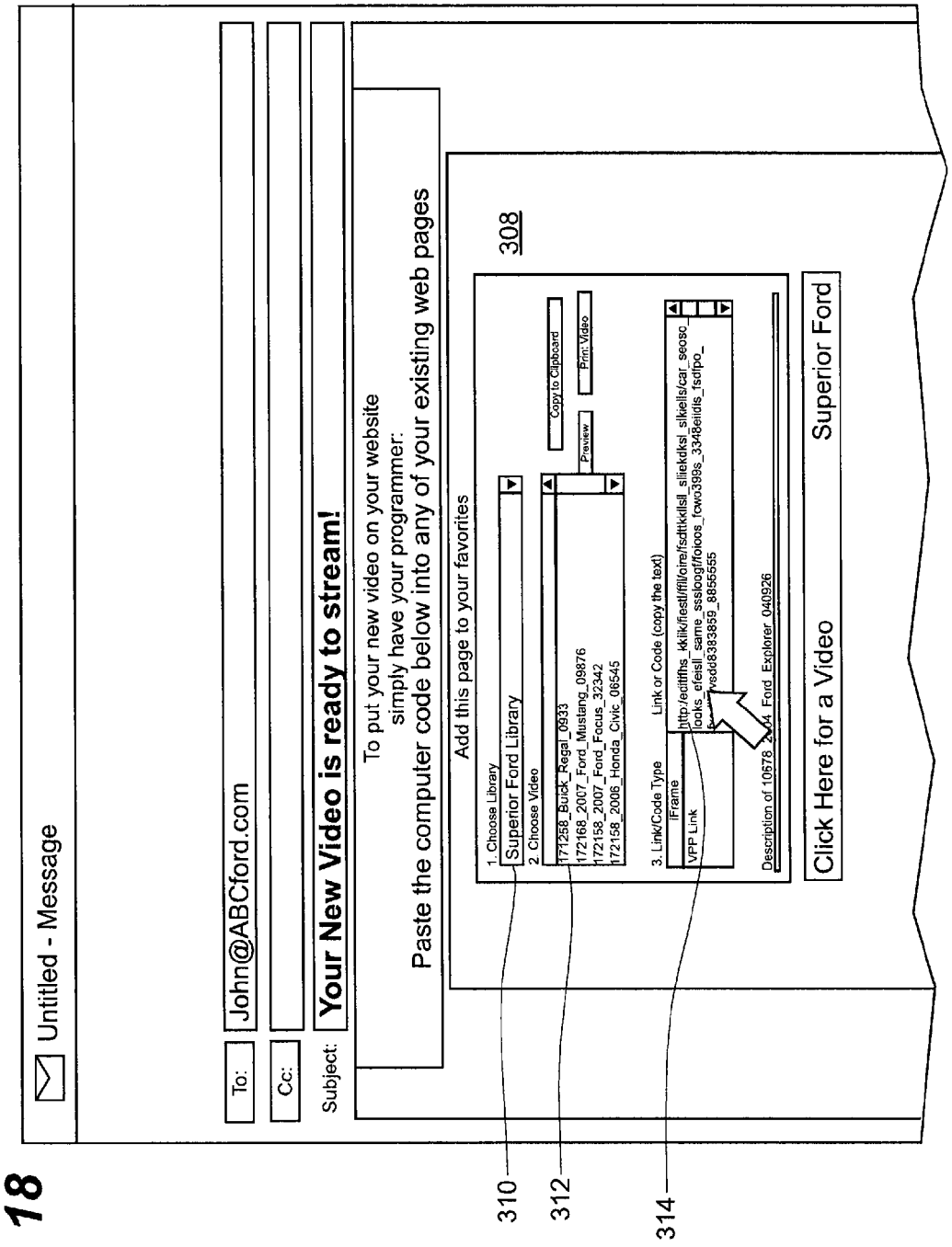
FIG. 18 is a notification email according to an embodiment of the present invention.
Figure 19:
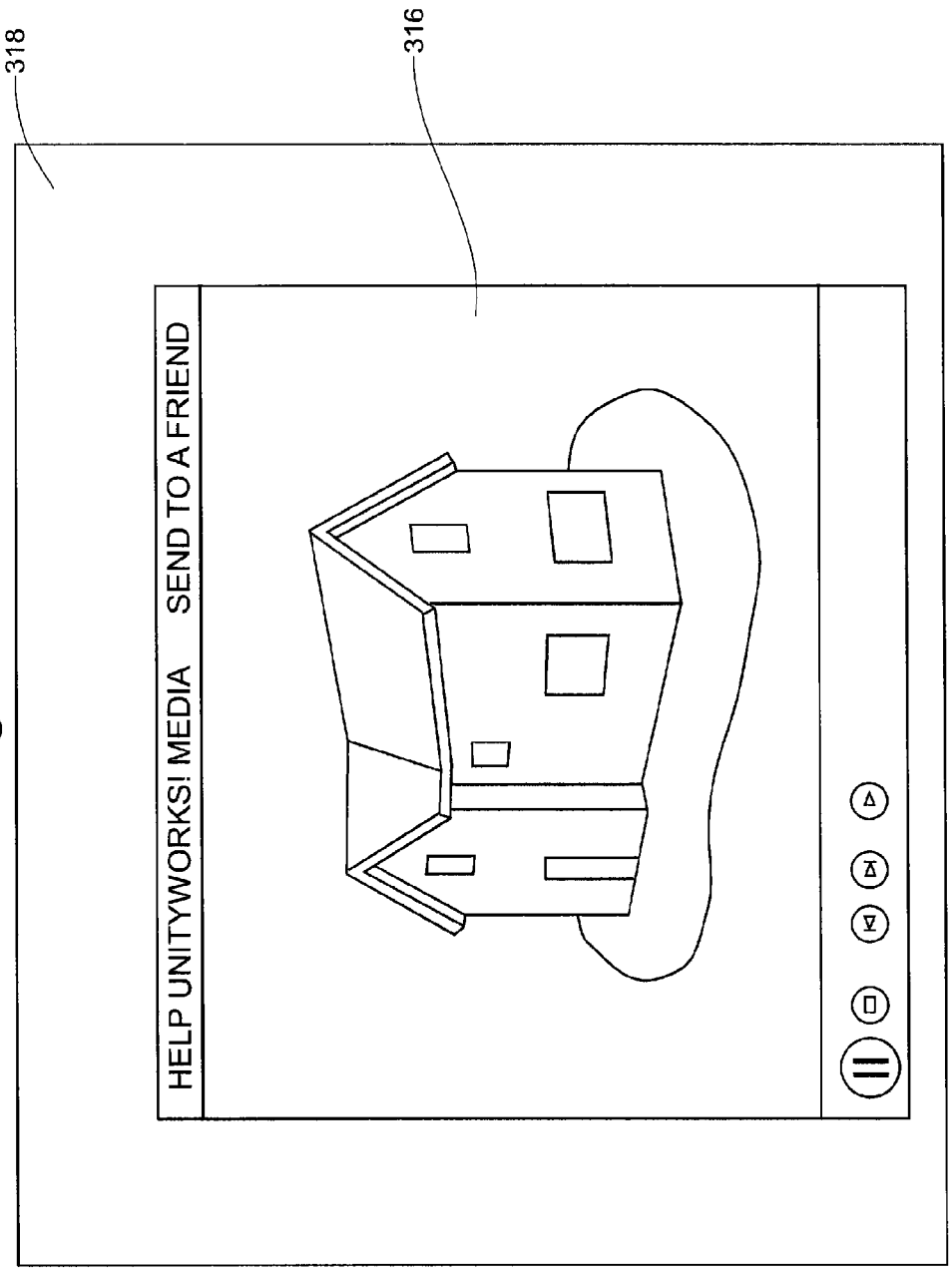
FIG. 19 is a customer webpage displaying a broadcast quality advertisement according to an embodiment of the present invention.

Upon completion of the broadcast quality advertisement, the third party video producer can send an email 308 to the customer to notify it that its order has been completed (FIG. 18). Within the email 308, the customer can select a specific video 312 from a specific customer library 310 to display the source code 314 for the advertisement. The customer can then embed the source code 314 within its website 318 to allow the display of its broadcast quality advertisement 316 (FIG. 19). In an alternate embodiment, the email may contain either 1) an iframe code that may be inserted by the customer into a web page such that the page may be served up by the customer, or 2) a link to the rich media clip. In another embodiment, the third party video producer may be contracted to promulgate emails containing the rich media clip, such as, for example, by incorporating an iframe or link to the rich media clip in an email as described in U.S. Patent Publication No. 20050240596A1, the disclosure of the detailed description of the invention which is hereby incorporated by reference other than the express definitions contained therein.

Figure 20:
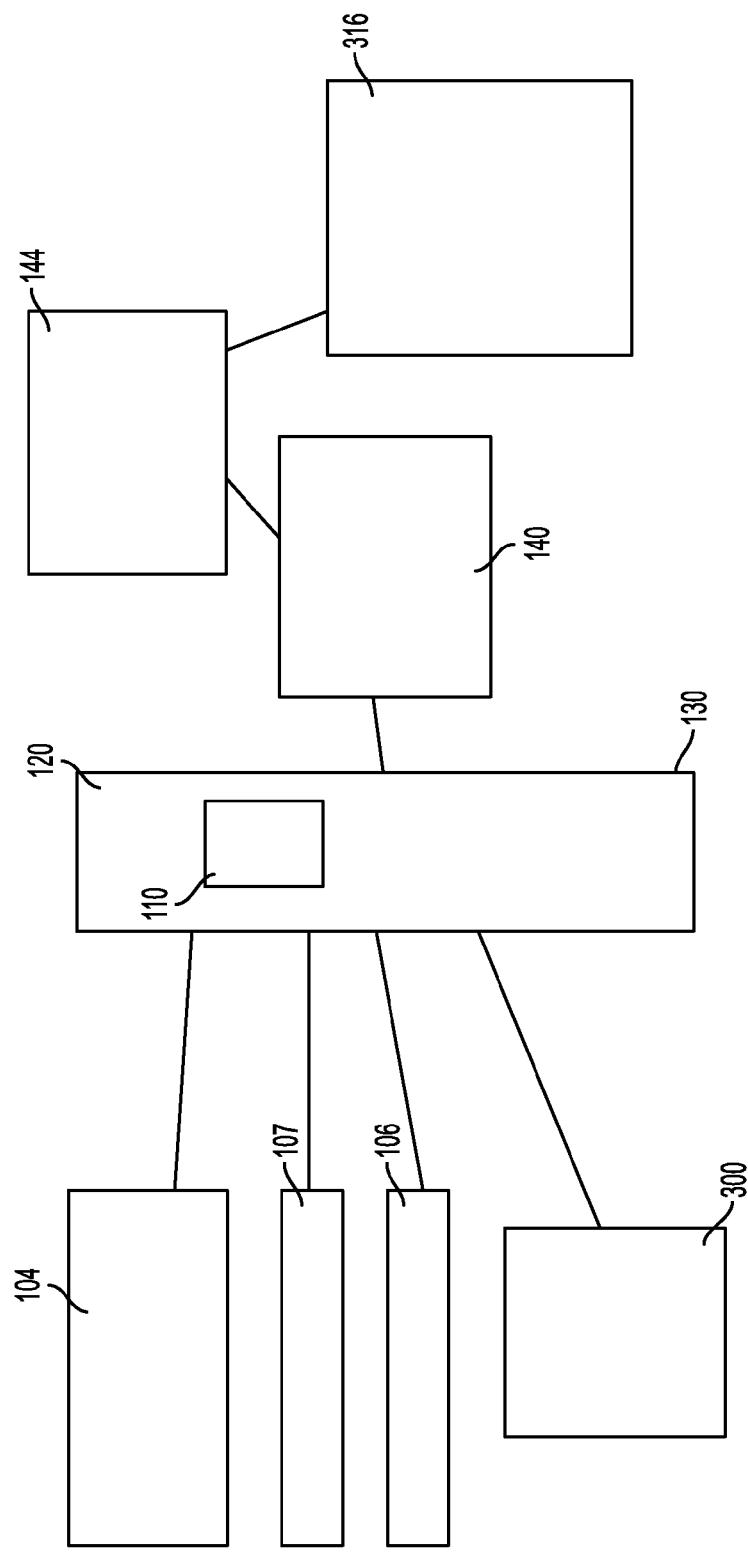
FIG. 20 is a diagram illustrating a method and system for high quality semi-automatic production of customized rich media video clips according to an embodiment of the present invention.

Referring now to FIG. 20 there can be seen another diagram illustrating a method and system for high quality semi-automatic production of customized rich media video clips according to an embodiment of the present invention. The various elements of the diagram identified by the various reference characters have already been described in reference to the previous Figures.

Figure 21:
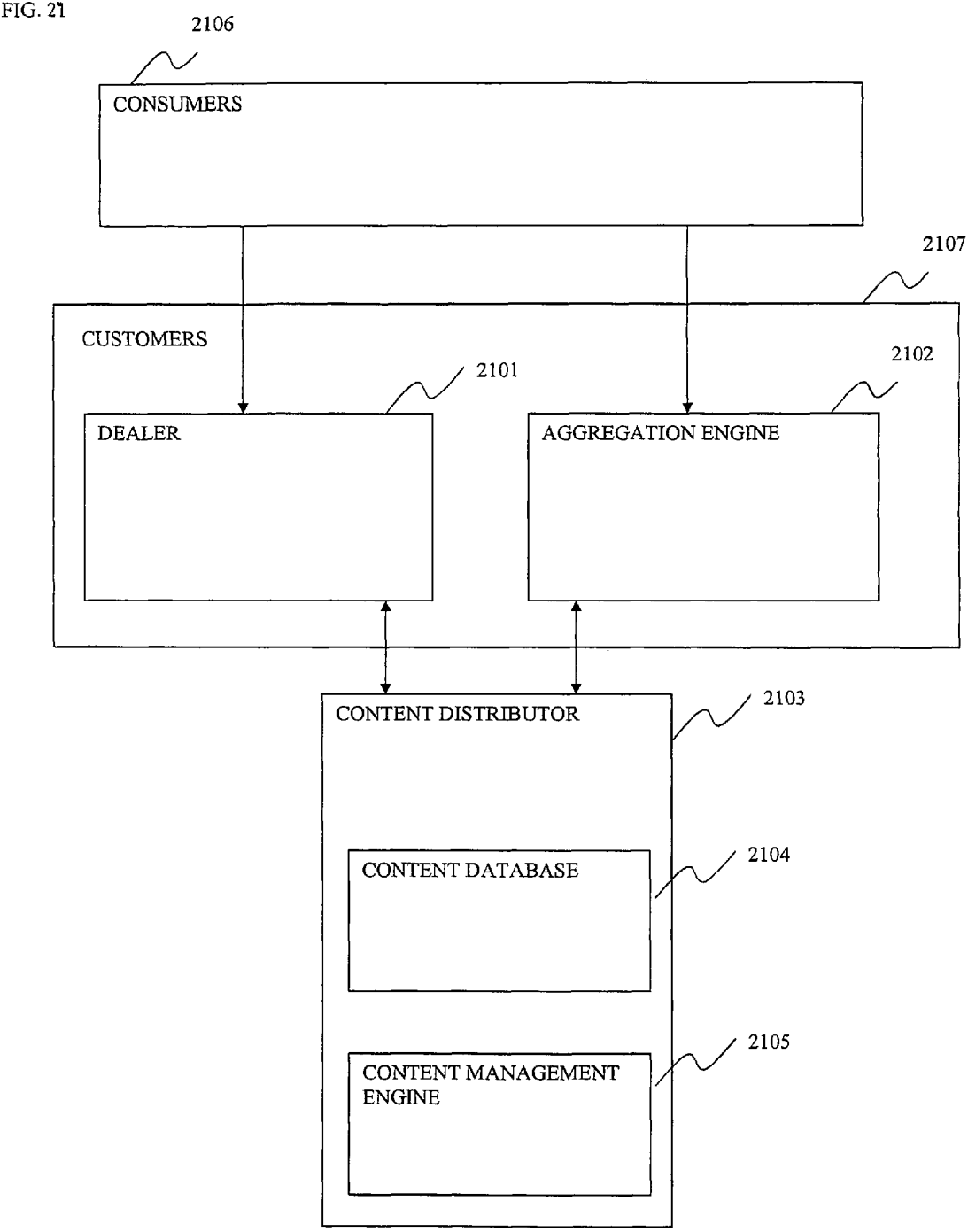
FIG. 21 illustrates generally a block diagram of avenues for the conveyance of information relating to the sale of goods and/or services to consumers.

FIG. 21 generally illustrates a block diagram of the presentation of information relating to the sale of goods and/or services to consumers 2106. Although described with reference to automobile sales, it is to be understood that the distribution of information relating to any goods and/or services are within the scope of the invention. In certain embodiments, the present invention has particular applicability to goods and services that are either individually unique or more expensive like durable goods, or both. Consumers 2106 can access websites of customers 2107 for information. Customers can include car dealers 2101, or groups of dealers, whose websites convey information to consumers 2106 relating to the goods and/or services made available by the dealers. Other customers can include aggregation engines 2102 whose websites convey information to consumers 2106 relating to goods and/or services of a variety of dealers 2101, including new car dealers, used car dealers, and individuals attempting to sell a cars themselves. Aggregation engine 2102 websites can include, for example, websites such as Autotrader and cars.com. Aggregation engine 2102 websites can acquire information relating to the goods and/or services provided by dealers 2101 directly from communication with dealers 2101 themselves. Aggregation engine 2102 websites can also acquire information by accessing the content available on dealer 2101 websites, or through content created for other avenues of content distribution such as television, radio, or print media.

Content distributor 2103 can receive and provide information relating to goods and/or services offered by customers 2107 such as dealers 2101 and aggregation engines 2102. Such information can include pictures, video, descriptive text, specials, or sale prices relating to goods and/or services. Content distributor 2103 can be made available to customers 2107, such as dealer 2101 and aggregation engine 2102, by means commonly known, for example a database or website, or by interactive custom cable or satellite television channels accessible over an interactive networked communication system. Interactive networked communication system includes at least one server and at least one client interconnected with the server. The client is the computer, interactive television, or other device of the customer. Interactive networked communication system can include one server or multiple servers and one client or multiple clients.

Figure 22:
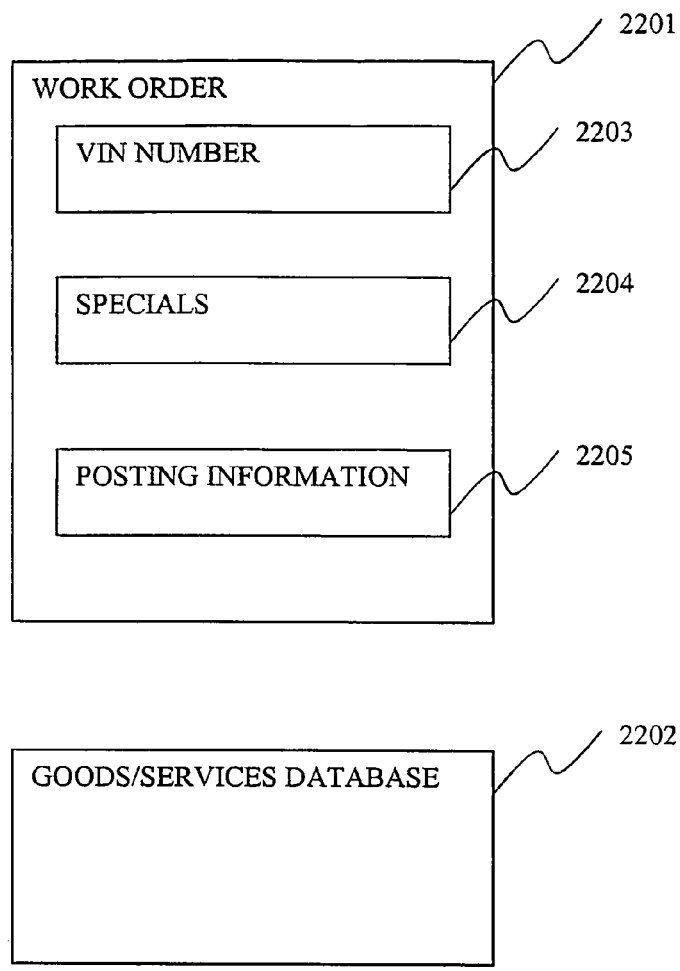
FIG. 22 illustrates generally a block diagram of a work order according to the subject matter disclosed herein.

FIG. 22 generally illustrates a block diagram of a work order 2201 that can be input by a customer 2107 of content distributor 2103. Work order 2201 may contain information as previously discussed herein, such as content to be included in a rich media video clip. Work order 2201 may further contain information relating to a goods/services database 2202, for example a VIN database or MLS database. Goods/services database 2202 includes information about specific cars (VIN database) or real estate properties (MLS database), or other specific identifications of goods and/or services. Work order 2201 may contain a goods/services database identification of one or more particular goods and/or services, such as a VIN number 2203 of an automobile.

Work order 2201 may further include one or more specials 2204 relating to goods and/or services, such as information relating to a sale for the particular good and/or service. Specials 2204 may also include information such as what a specific dealer 2101 or group of dealers 2101 is offering in a particular sale and what VIN number 2203, set of VIN numbers, car make or car model the sale applies to. Specials may also include information relating to other goods and/or services, e.g. a gasoline discount or maintenance discount, that may be associated with the purchase of an identified automobile or the purchase of any automobile from an identified dealer.

Work order 2201 may also include posting information 2205. Posting information 2205 may include when a particular good and/or service is available for purchase, when a sale price or special begins and when it ends, and when an ad is to be made available for access by consumers 2106. Work order 2201 may be acquired from customer 2107 by input through a website, through oral discussion with account managers, or through access to a customer's 2107 website or advertisements. It is to be understood that work order 2201 can be provided through any form of communication that conveys information relating to the sale of goods and/or services.

Referring again to FIG. 21, content distributor 2103 can be adapted to manage content relating to the goods and/or services of customers 2107. Content distributor 2103 can include a content database 2104 adapted to hold information such as video, images, pictures, descriptive text, specials, sale prices, and other information as discussed above relating to a customer's inventory. Content database 2104 can include information related to a particular automobile (e.g. referenced by VIN number), a make or model of automobile, or a particular dealer 2101 or set of dealers 2101. Content distributor 2103 can further include content management engine 2105. Content management engine 2105 can be adapted to process work order 2201, update content database 2104, and manage the distribution of content to consumers 2106.

Figure 23:
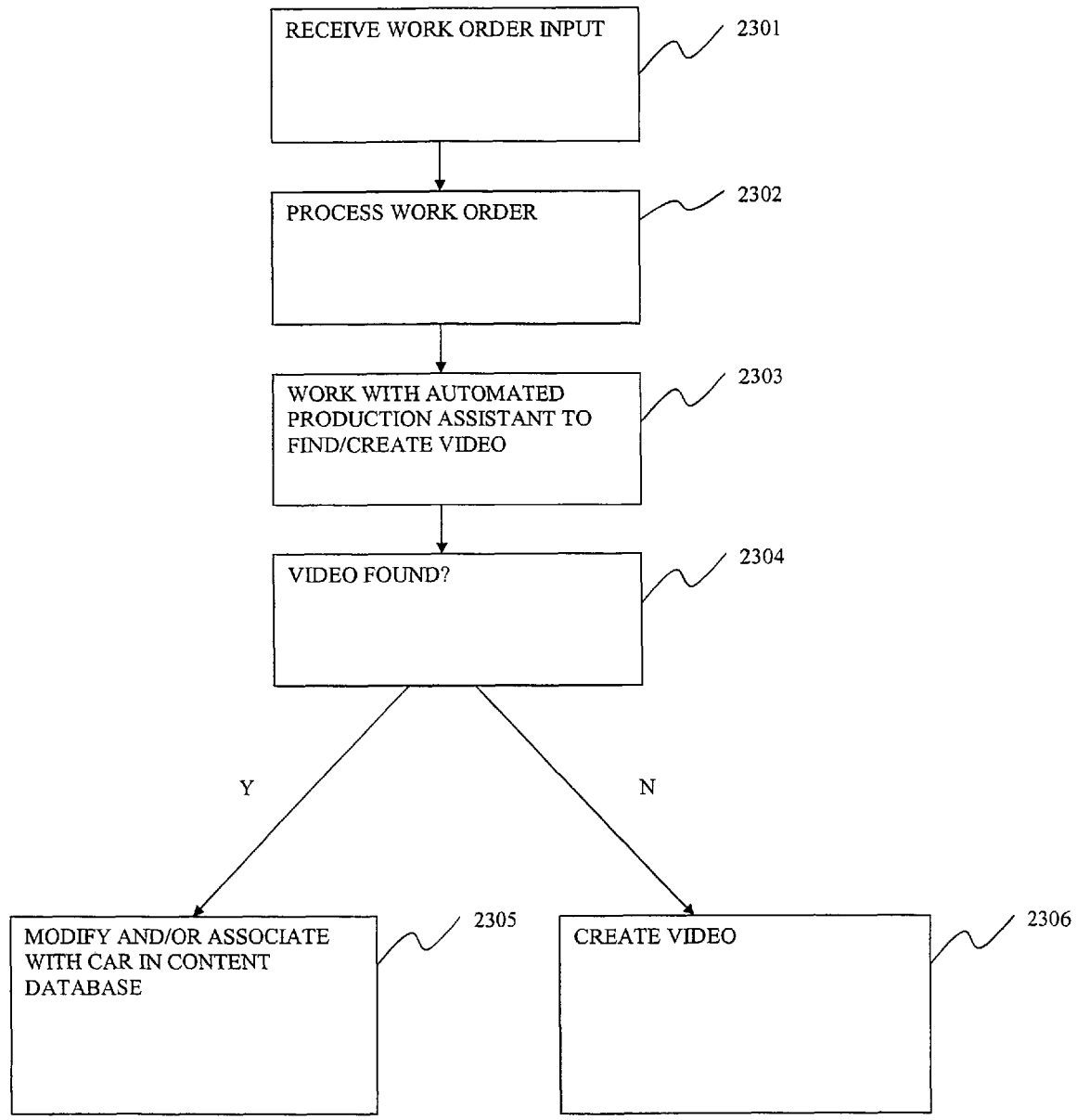
FIG. 23 illustrates generally a flow chart diagram of the operation of content distributor according to the subject matter disclosed herein.

FIG. 23 illustrates generally a flow chart diagram of the operation of content distributor 2103. At step 2301, content distributor 2103 receives as input a work order 2201 from a customer. At step 2302, content management engine 2105 processes the work order 2201. The step of processing the work order 2201 can include updating or storing information contained in content database 2104 based on the information contained in the work order 2201. At step 2303, content management engine 2105 can work with automated production assistant 120 to find and/or create rich media video clips based on information provided by the work order 2201. At step 2304, content management engine search content database 2104 and other available databases for video of the same or similar automobile(s) specified by work order 2201. The search of content database 2104 may be based on the make, model, features, condition, or other characteristics of the car(s) specified by work order 2201. If video of the requested automobile(s) is found, at 2305, the video can be modified by the automated production assistant 120 or an operator. The updated video can then be associated with the requested automobile(s) in content database 2104. Alternatively, the video(s) can be left as is. If video of the requested automobile(s) is not found, at step 2306 a rich media video clip can be created as described below.

Figure 25:
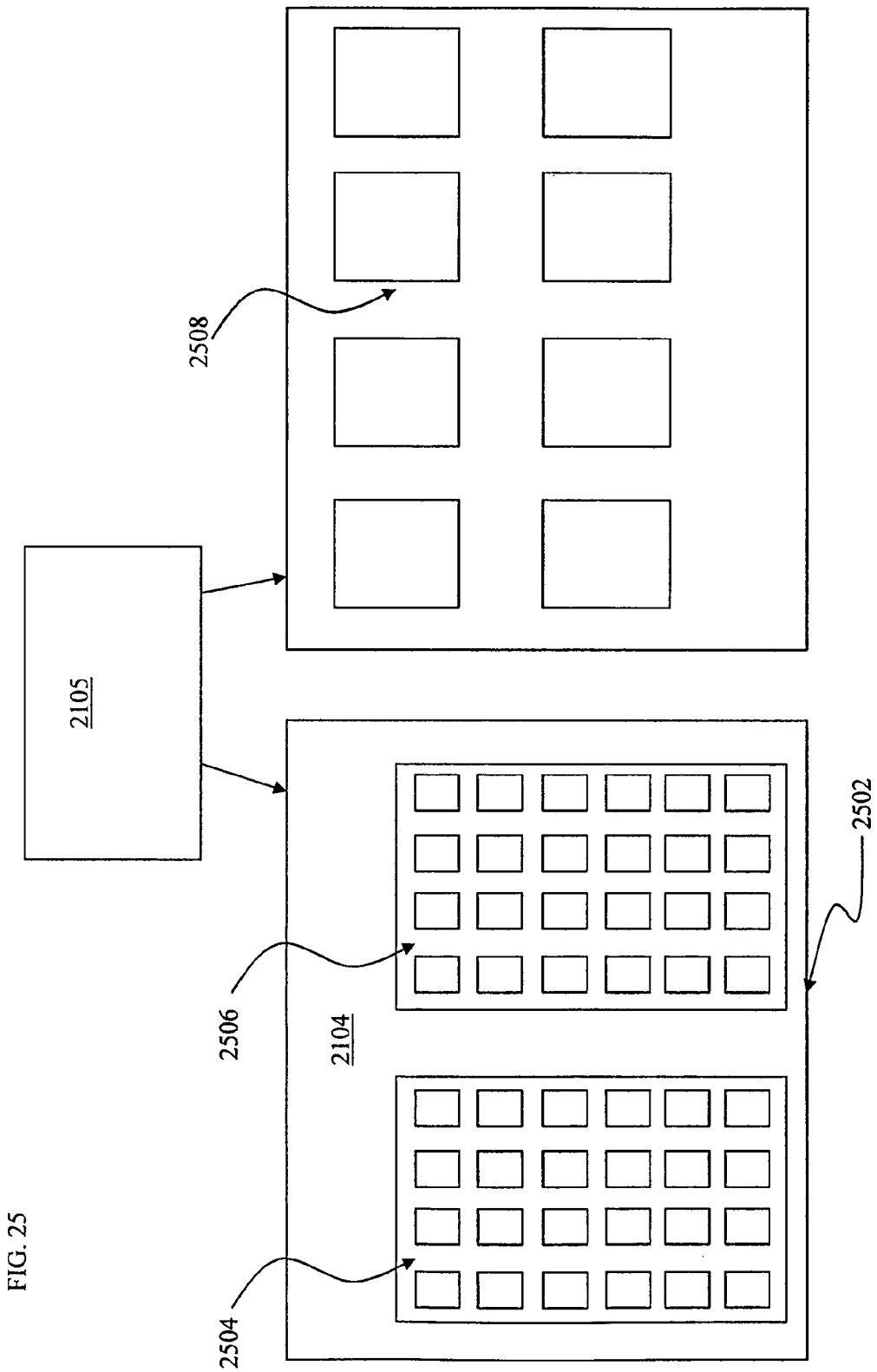
FIG. 25 is a block diagram of content engine available resources.

FIG. 25 generally illustrates a block diagram of various resources available to content management engine 2105. Content database 2104 includes a plurality of production templates 2502 that can aid in turning the information contained in work order 2201 into a video. Production templates 2502 can include graphic element templates 2504 and production timeline templates 2506. Production templates 2502 allow the raw feed information contained in a work order to be quickly put into usable video elements and are constantly updated and maintained. Content management engine 2105 also searches various data libraries 2508 for elements that can be used along with feed information to compile a video. Data libraries 2508 can include VIN explosion libraries, libraries of images taken of new and used cars, pre-produced graphic transition and effects libraries, and script libraries for generic scripts, specific automobiles, and specific automobile models.

Content management engine 2105 can also operate with auto script generator 400 to automatically generate a script 562 or script segment. If a script relating to the same or a similar automobile(s) to the automobile(s) indicated in work order 2201 is available, then script 562 can be automatically generated based on an the existing script associated with the same or similar automobile(s).

Figure 26:
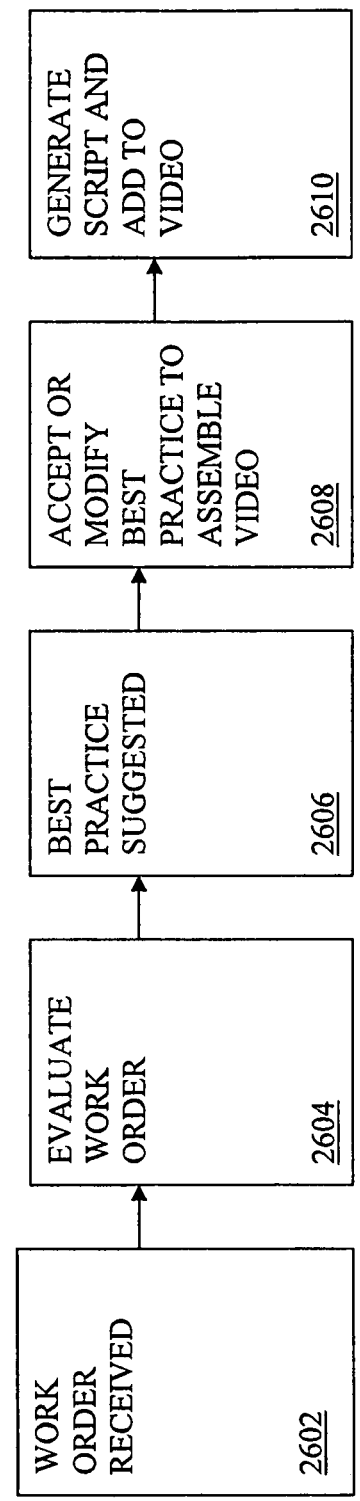
FIG. 26 is a block diagram of human work order activity in creation of a video.

The feed information in work order 2201 is used to create a video at step 2306 in FIG. 23 through a combination of human effort and logic, as shown in a block diagram in FIG. 26. Initially, a work order 2201 is received at step 2602 as previously described. The automated production assistant than evaluates the work order at step 2604. The best graphic element and production timeline templates, video elements and script are then selected. To generate a script, the work order can be evaluated and the automated production assistant can pick the best saleable features of the automobile identified in the work order 2201. A pre-existing video of the identified automobile, if one already exists, can be accessed, or the VIN number of the automobile can be compared to existing VIN feature libraries to aid in automatically generating a script or script segment. The templates, elements, and script are then presented to a human producer as suggested best practice for assembling a video from the work order at step 2606. The human producer, at step 2608, then either accepts the suggested best practice or overrides and modifies the suggested timeline and video elements to create the video. At, step 2610, the human produce can record the script and add it to the video. Alternatively, the voiceover for the script can be automatically generated. A simulation of a human voice for the voiceover can be generated using human voice simulation techniques commonly known in the art. As a further alternative, pre-recorded words or phrases can be stitched together to create the voice over.

Content management engine 2105 can also continuously or intermittently monitor the information contained in content database 2104 for changes. For example, when the time period for a special (as indicated by posting information 2205 in work order 2201) has expired or an automobile is no longer available, the change can be reflected in content database 2104.

Content distributor 2103 can also update information regarding the goods and/or services conveyed to consumers 2106 through dealer 2101 website or aggregation engine 2102 website. When a change occurs (typically indicated through input of work order 2201 or another trigger such as elapsed time), content management engine 2105 can modify the information conveyed to consumers 2106. Alternatively, dealer 2101 website or aggregation engine 2102 website can have access to content database 2104. Then, when a change occurs, one or more indicators in content database 2104 can be updated such that customer 2107 may reflect the change in the information conveyed to consumers 2106.

Content management engine 2105 can further be adapted to modify a video for a specific good and/or service based on a change. For example, a video created for a particular automobile can be pre-pended, appended, overlaid, or spliced with additional information relating to the sale of that automobile such as a sale price, dealership identification of where the automobile is available, or specials associated with the purchase of that automobile. This additional information may take the form of, for example, additional video, voice-over speech, or text. For example, the content management engine 2105 can modify the video to insert a new special 2204 that was recently made available.

Content management engine 2105 can also control the display of information based on demographic information about consumer 2106, or by choices consumer 2106 makes while searching for goods and/or services. In one embodiment, where consumer 2106 selects a particular automobile for display on aggregation engine 2102 website or dealer 2101 website, content management engine 2105 can provide information about similar automobiles that consumer 2106 may be interested in. When consumer 2106 visits aggregation engine 2102 website or dealer 2101 website, content management engine 2105 can display pre-selected cars that demographic information indicates that consumer 2106 may be interested in. When a consumer's 2106 demographic information or choices indicate interest in a particular special 2204 associated with an automobile, e.g. a discount on gasoline purchases, content management engine 2105 can provide information about other cars for which the same or similar specials 2204 are offered.

Figure 24:
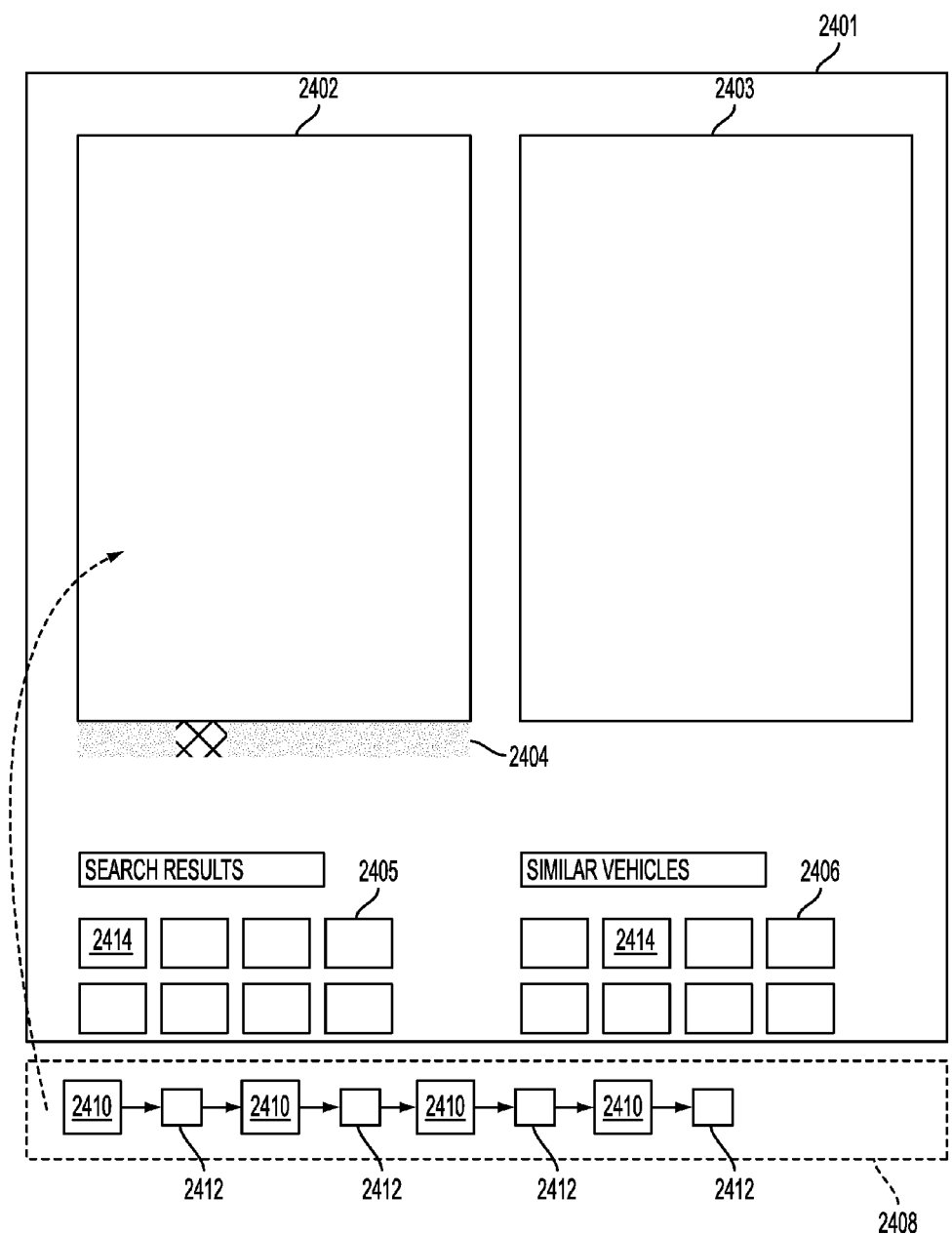
FIG. 24 illustrates generally a block diagram of the display of content according to the subject matter disclosed herein.

FIG. 24 generally illustrates one manner of displaying information relating to the sale of goods and/or services as described herein. A display 2401 can convey information related to goods and/or services in response to a search performed by a consumer 2106, such as a search for a particular make or model of automobile. Search can be performed on a website, such as, for example, a dealer 2101 website or a content aggregator 2102 website. Display 2401 can include one or more videos 2402 of goods and/or services selected based on the consumer search. Alternatively, display 2401 can result from a selection of a vehicle on a customer website. Display 2401 can include controls to manipulate the display of video 2402, such as scroll bar 2404 as illustrated in FIG. 24, or volume controls. Scroll bar 2404 can allow consumer to skip ahead or go back in a video 2402. Display 2401 can further include additional description 2403 related to the automobile depicted in the video 2402. Description 2403 can include, for example, text, pictures, or audio information further describing the automobile, or sales or specials related to the automobile. Display 2401 can be presented through various ways, such as, for example, a web portal or a plug-in on a website. Display 2401 can be run by the same entity that runs the website on which it is presented or by a different entity. In one embodiment, display 2401 is presented on a client computer which receives commands and information from a server.

When the consumer's search returns a video of more than one car that matches the search terms (or car selection on customer website), display 2401 can include static depictions 2414 of additional search results 2405. In one embodiment, video 2402 can seamlessly transition between a rich media video clip corresponding to each search result depiction 2414 in a sequential manner. As the video 2402 changes to display rich media video clips of different automobiles, the additional description 2403 can also change to correspond to the automobile currently being displayed in the video. The additional search results 2405 can also be provided to a user in a selectable format. Additional search results 2405 can be provided to consumer 2106, for example, in the form of thumbnails or text. In one embodiment, the consumer 2106 can skip between the automobiles in the search results by clicking on the depiction 2414 associated with a search result. The video 2402 will then seamlessly skip to a rich media video clip for the selected result. The video 2402 can then continue by playing the next search result, or, alternatively, can return to the first search result that was skipped.

Display 2401 can further include results showing similar automobile(s) 2406. A depiction 2414, such as thumbnails or text, of automobiles having similar features and/or similar specials to the automobile(s) searched for by the consumer can be displayed. If a consumer 2106 selects one of the similar results, the video 2402 can seamlessly skip to a rich media video clip of the selected automobile and additional description 2403 of the selected vehicle can be displayed. Once the rich media video clip corresponding to the selected automobile has completed, the video can continue to display rich media video clips of similar automobiles 2406, or can return to displaying rich media video clips of the automobiles in the additional search results 2405. Where display 2401 results from a selection of a vehicle on a dealer or other website, similar automobile(s) 2406 can comprise, for example, similar new automobile(s) or comparable used automobiles.

Video 2402 can be displayed in a seamless concatenated sequence 2408. Seamless sequence 2408 can include video clips of automobiles 2410 with each automobile having a special 2412 relating to that automobile tagged thereto. Each special 2412 can play seamlessly along with the clip of the automobile 2410 to which it is tagged. One or more automobiles 2410 can alternatively have multiple specials 2412 or no special 2410 tagged to it. The user can skip around in the sequence 2408 by clicking on additional search results 2405 or similar vehicles 2406.

The behavior of consumers on customer websites, such as dealer websites and aggregation engine websites, can be used to refine the display 2401. The description 2403 on display 2401 can be modified to display suggested options to the consumer for refining the search results 2405. For example, where the click behavior of the consumer appears to indicate that the consumer is interested in a certain special, the description 2403 can display an option to allow the consumer to display all search results that are keyed to that particular special or similar specials.

Figure 27:
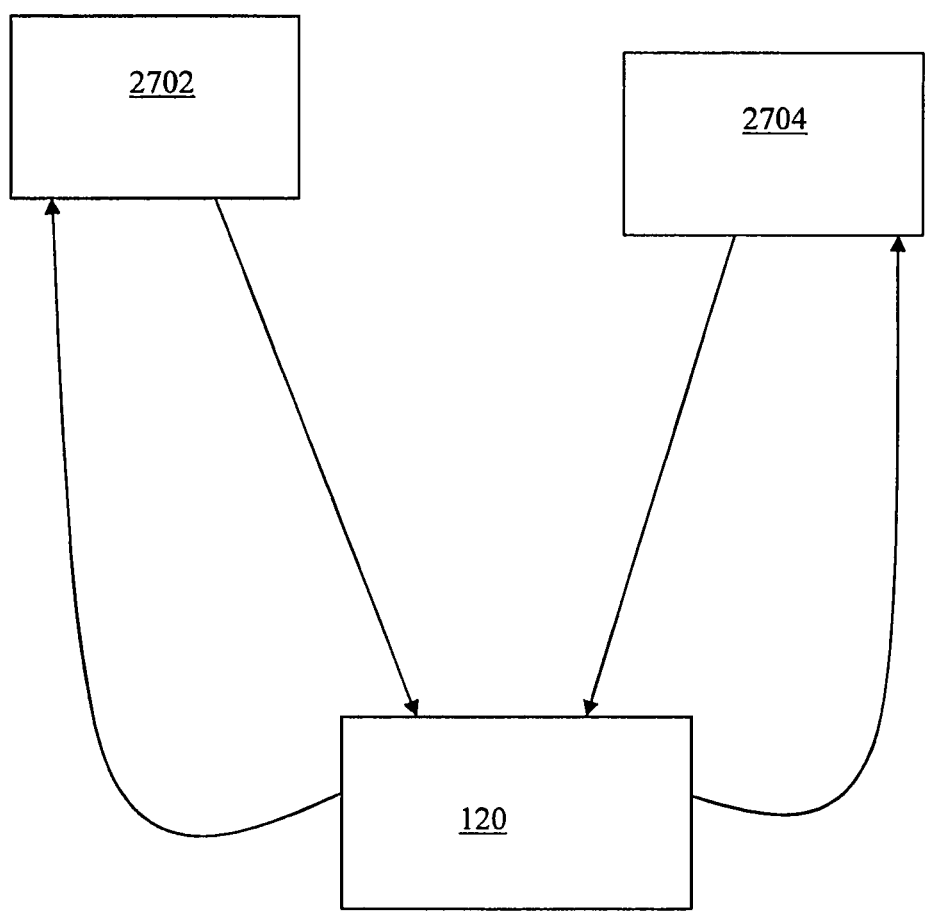
FIG. 27 is a diagram depicting click behaviors of customers on dealer and aggregation engine websites.

Referring to FIG. 27, the click behavior of customers on dealer websites 2702 and aggregation engine websites 2704 can also be used to refine the video clips presented on display 2401. The selections made by consumers on the websites 2702, 2704 are transmitted back to the automated production assistant 120. The videos onto which consumers click the most indicate which types of video elements are better at selling cars. The production templates 2502 used, as well as the type, content, and ordering of the graphic elements and scripts suggested by the automated production assistant 120, can subsequently be modified to include, or make more prominent, such elements. Newly assembled video clips can also take these preferences into account. Modified and newly assembled videos incorporating user preferences based on the click behavior analysis can then be presented on the websites 2702, 2704. In this way, the video clips presented in display 2401 can continually be refined so that the elements comprising the clips are presented in a way that provides consumers with the most relevant search results and customers the most effective advertising presentations.

The above description of the disclosed embodiment is provided to enable any person skilled in the art to make or use the invention. Various modifications to these embodiments will be readily apparent to those skilled in the art, and the generic principles described herein can be applied to other embodiments without departing from the spirit and scope of the invention which is limited by nothing other than the appended claims.

The invention claimed is:

1. A method implemented on a computer having a processor, a storage, and a communication platform connected to a network, for producing a continuous rich media video clip describing a good and/or service offered for sale, comprising the steps of:

receiving, over the network, a request from a user for creating a continuous rich media video clip describing a good and/or service;

obtaining first information related to the good and/or service where the first information characterizes the good and/or service;

selecting, by an automated production assistant, one or more rich media video clips from a database based on the request and the first information, where each of the rich media video clips describes at least one feature of the good and/or service and at least one of the video clips has a voice-over audio element created in accordance with a script, which is automatically generated with respect to the good and/or service using one or more templates, wherein each of the templates is selected automatically based on the good and/or service offered for sale, each template being a lexically meaningful sentence of connected words which include alphanumerical descriptors corresponding to the feature and which represents a variant of a sentence in a selected language, each variant describing the at least one feature with a slant tailored to a particular promotion related theme;

automatically identifying second information characterizing one or more special offers associated with the good and/or service;

automatically creating the requested continuous rich media video clip for the good and/or service by stitching together the second information and the one or more rich media video clips, wherein the continuous rich media video clip has the one or more rich media video clips automatically arranged in a sequence with the second information associated with each special offer seamlessly incorporated therein; and transmitting the continuous rich media video clip to the user as a response to the request.

2. The method of claim 1, wherein each special offer includes at least one of a human audio voice-over, text, and a rich media video clip.

3. The method of claim 1, wherein the one or more special offers relate to at least one of a sale of the good and/or service, a good and/or service associated with the good and/or service, a time frame of the special offer, a business entity making the special offer, and a specific product the special offer is directed to.

4. The method of claim 1, wherein the request is generated based on a search query submitted by a user on a website.

5. The method of claim 4, wherein the one or more special offers are identified obtained based on information regarding the user.

6. The method of claim 5, wherein the information regarding the user includes at least one of demographic information about the user and recorded past activities of the user on the website.

7. The method of claim 1, wherein the one or more special offers are obtained based on information related to an inventory of a customer.

8. The method of claim 1, wherein the goods and/or services are automobiles.

9. The method of claim 8, wherein the one or more special offers are directed to at least one of a good/service from one or more makers, goods/services from one or more dealers, goods/services of a specific type and/or model from one or more providers, goods/services having one or more defined features, and a specific good/service identifiable by a unique identification.

10. The method of claim 1, wherein the selection of the one or more rich media video clips is automatically determined based on recorded activities of the user.

11. The method of claim 1, wherein the sequence of the one or more rich media video clips in the continuous rich media video clip is automatically determined based on recorded activities of the user.

12. The method of claim 1, wherein the identification of the one or more special offers is based on recorded activities of the user.

13. A method implemented on a computer having a processor, a storage, and a communication platform connected to a network for creating a continuous rich media video clip describing a good and/or service, comprising the steps of:
receiving, by the processor via the communication platform, information regarding a special offer associated with the good and/or service;
automatically selecting, from a database storing a plurality of rich media video clips describing goods and/or services, one or more rich media video clips, each of which describes at least one feature of the good and/or service that the special offer is directed to, where at least one of the video clips has a voice-over audio element created in accordance with a script, which is automatically generated with respect to the good and/or service using one or more templates where each of the templates is selected automatically based on the good and/or service offered for sale, each template being a lexically meaningful sentence of connected words which include alphanumerical descriptors corresponding to the feature and which represents a variant of a sentence in a selected language, each variant describing the at least one feature with a slant tailored to a particular promotion related theme; and
automatically creating the continuous rich media video clip describing the good and/or service by stitching together a representation of the special offer and the one or more rich media video clips describing the good and/or service, wherein the continuous rich media video clip has the one or more rich media video clips automatically arranged in a sequence with information regarding the special offer incorporated therein seamlessly; and
transmitting the created continuous rich media video clip.

14. The method of claim 13, wherein the representation of the information regarding the special offer is selected from the group including at least one of a human audio voiceover, text, and a rich media video clip.

15. The method of claim 13, wherein the representation of the information regarding the special offer is stored in and retrieved from a data storage.

16. The method of claim 13, wherein the representation of the information regarding the special offer is generated based on information related to the special offer.

17. The method of claim 13, wherein the special offer specifies at least one of a sale of the good and/or service, a good and/or service associated with the good and/or service, a duration of the special offer, a party offering the special offer, and any other offer included in the special offer.

18. The method of claim 13, wherein the good and/or service is an automobile.

19. The method of claim 18, wherein a special offer related to an automobile is directed to at least one of automobiles from a specific maker, automobiles from a dealer, automobiles of a specified type, automobiles of a specified model, automobiles having specified features, and a specified automobile identified by a vehicle identification number (VIN).

20. A machine-readable non-transitory medium having program recorded thereon for producing continuous rich media video clip describing a good and/or service for sale, the information, when read by the machine, causes the machine to perform the following:
receiving a request from a user for creating a continuous rich media video clip describing a good and/or service;
obtaining first information related to the good and/or service where the first information characterizes the good and/or service;
selecting, by an automated production assistant, one or more rich media video clips from a database based on the request and the first information, where each of the rich media video clips describes at least one feature of the good and/or service and at least one of the video clips has a voice-over audio element created in accordance with a script, which is automatically generated with respect to the good and/or service using one or more templates, wherein each of the templates is selected automatically based on the good and/or service offered for sale, each template being a lexically meaningful sentence of connected words which include alphanumerical descriptors corresponding to the feature and which represents a variant of a sentence in a selected language, each variant describing the at least one feature with a slant tailored to a particular promotion related theme;
automatically identifying second information characterizing one or more special offers associated with the good and/or service;
automatically creating the requested continuous rich media video clip for the good and/or service by stitching together the second information and the one or more rich media video clips, wherein the continuous rich media video clip has the one or more rich media video clips automatically arranged in a sequence with the second information associated with each special offer seamlessly incorporated therein; and
transmitting the continuous rich media video clip to the user as a response to the request.

21. A machine-readable non-transitory medium having information recorded thereon for creating a continuous rich media video clip describing a good and/or service, the information, when read by the machine, causes the machine to perform the following:
receiving information regarding a special offer associated with the good and/or service;
automatically selecting, from a database storing a plurality of rich media video clips describing goods and/or services, one or more rich media video clips each of which describing at least one feature of the good and/or service that the special offer is directed to, where at least one of the video clips has a voice-over audio element created in accordance with a script, which is automatically generated with respect to the good and/or service using one or more templates where each of the templates is selected automatically based on the good and/or service offered for sale, each template being a lexically meaningful sentence of connected words which include alphanumerical descriptors corresponding to the feature and which represents a variant of a sentence in a selected language, each variant describing the at least one feature with a slant tailored to a particular promotion related theme; and automatically creating the continuous rich media video clip describing the good and/or service by stitching together a representation of the special offer and the one or more rich media video clips describing the good and/or service, wherein the continuous rich media video clip has the one or more rich media video clips automatically arranged in a sequence with information regarding the special offer incorporated therein seamlessly; and transmitting the created continuous rich media video clip.

* * * * *